United States Patent
Aarnio et al.

(10) Patent No.: US 7,149,503 B2
(45) Date of Patent: Dec. 12, 2006

(54) SYSTEM AND METHOD FOR ASSOCIATING POSTMARK INFORMATION WITH DIGITAL CONTENT

(75) Inventors: Ari Aarnio, Espoo (FI); Ilkka Tiainen, Espoo (FI); Ilkka Rahnasto, Espoo (FI)

(73) Assignee: Nokia Corporation, Espoo (FI)

( * ) Notice: Subject to any disclaimer, the term of this patent is extended or adjusted under 35 U.S.C. 154(b) by 219 days.

(21) Appl. No.: 10/744,240

(22) Filed: Dec. 23, 2003

(65) Prior Publication Data

US 2005/0136886 A1    Jun. 23, 2005

(51) Int. Cl.
*H04M 3/42* (2006.01)
(52) U.S. Cl. ............. 455/414.1; 455/41.2; 455/456.1; 455/456.3; 348/211.1; 382/101; 382/176
(58) Field of Classification Search ........... 455/41.2, 455/404.2, 415, 456.1, 456.3, 456.5, 456.6, 455/457, 517; 348/207.1, 441, 469, 552, 348/231.2, 231.3; 355/27; 382/101, 176, 382/181, 217; 358/402, 462; 209/584; 705/14; 379/80; 340/426.19, 539
See application file for complete search history.

(56) References Cited

U.S. PATENT DOCUMENTS

| | | | |
|---|---|---|---|
| 5,415,167 A | | 5/1995 | Wilk |
| 5,426,594 A | * | 6/1995 | Wright et al. .............. 709/206 |
| 5,463,696 A | * | 10/1995 | Beernink et al. ........... 382/186 |
| 5,478,989 A | | 12/1995 | Shepley |
| 5,499,294 A | * | 3/1996 | Friedman ................... 713/179 |
| 5,508,695 A | | 4/1996 | Nelson et al. |
| 5,513,117 A | * | 4/1996 | Small ........................ 700/233 |
| 5,550,535 A | | 8/1996 | Park |
| 5,592,375 A | | 1/1997 | Salmon et al. |
| 5,629,981 A | * | 5/1997 | Nerlikar .................... 713/168 |
| 5,682,024 A | * | 10/1997 | Koopman et al. .......... 187/394 |
| 5,682,142 A | | 10/1997 | Loosmore et al. |
| 5,740,538 A | * | 4/1998 | Joyce et al. ............. 455/456.2 |
| 5,771,283 A | * | 6/1998 | Chang et al. .......... 379/142.01 |
| 5,794,142 A | | 8/1998 | Vanttila et al. |
| 5,821,513 A | | 10/1998 | O'Hagan et al. |
| 5,886,646 A | | 3/1999 | Wantanabe et al. |
| 5,926,133 A | * | 7/1999 | Green, Jr. ................... 342/363 |
| 5,949,335 A | | 9/1999 | Maynard |
| 5,959,530 A | | 9/1999 | Lupien, Jr. et al. |

(Continued)

FOREIGN PATENT DOCUMENTS

DE    296 13 393 U1    12/1997

(Continued)

OTHER PUBLICATIONS

Radio Frequency Identification—A basic primer, Version 1.11, Sep. 28, 1999, http://www.aimglobal.org/technologies/rfid/resources/papers/rfid_basics_primer.htm (Printed from internet Jun. 26, 2002).

*Primary Examiner*—William Trost
*Assistant Examiner*—James D Ewart
(74) *Attorney, Agent, or Firm*—Hollingsworth & Funk, LLC

(57) ABSTRACT

A system and method is provided for associating postmark information with digital content. Content is created or otherwise selected from available content selections. Information is received at the mobile device from a radio frequency (RF) transponder. The information may include postmark information to allow the mobile device to associate the postmark information with the content, or may include information to allow the mobile device to send a message to a network service to associate the postmark with created or selected content.

43 Claims, 12 Drawing Sheets

U.S. PATENT DOCUMENTS

| | | |
|---|---|---|
| 6,018,774 A * | 1/2000 | Mayle et al. ............... 709/250 |
| 6,055,442 A | 4/2000 | Dietrich |
| 6,177,860 B1 | 1/2001 | Cromer et al. |
| 6,185,426 B1 * | 2/2001 | Alperovich et al. ..... 455/456.1 |
| 6,259,367 B1 | 7/2001 | Klein |
| 6,259,923 B1 * | 7/2001 | Lim et al. ................. 455/456.2 |
| 6,269,446 B1 * | 7/2001 | Schumacher et al. ....... 713/176 |
| 6,295,506 B1 | 9/2001 | Heinonen et al. |
| 6,370,389 B1 * | 4/2002 | Isomursu et al. ........... 455/466 |
| 6,370,568 B1 * | 4/2002 | Garfinkle .................... 709/206 |
| 6,424,838 B1 * | 7/2002 | Stobbe et al. ............ 455/456.1 |
| 6,446,208 B1 | 9/2002 | Gujar et al. |
| 6,574,604 B1 * | 6/2003 | van Rijn ........................ 705/1 |
| 6,577,901 B1 | 6/2003 | Thompson |
| 6,732,152 B1 * | 5/2004 | Lockhart et al. ............ 709/206 |
| 6,795,711 B1 * | 9/2004 | Sivula ........................ 455/466 |
| 6,804,379 B1 | 10/2004 | Rhoads |
| 6,816,725 B1 * | 11/2004 | Lemke et al. ............ 455/414.1 |
| 6,839,022 B1 * | 1/2005 | Benco et al. ............. 342/357.1 |
| 6,868,340 B1 * | 3/2005 | Alexander et al. ............ 702/5 |
| 2001/0051876 A1 * | 12/2001 | Seigel et al. .................... 705/1 |
| 2002/0070862 A1 * | 6/2002 | Francis et al. ........... 340/572.1 |
| 2002/0082001 A1 * | 6/2002 | Tanaka et al. .............. 455/414 |
| 2002/0130178 A1 | 9/2002 | Wan et al. |
| 2002/0131565 A1 * | 9/2002 | Scheuring et al. ....... 379/88.19 |
| 2003/0016804 A1 * | 1/2003 | Sheha et al. ........... 379/201.06 |
| 2003/0064685 A1 * | 4/2003 | Kim ............................. 455/90 |
| 2003/0088496 A1 | 5/2003 | Piotrowski |
| 2003/0148774 A1 * | 8/2003 | Naghian et al. ............. 455/456 |
| 2004/0002305 A1 * | 1/2004 | Byman-Kivivuori et al. .... 455/41.2 |
| 2004/0023686 A1 * | 2/2004 | King et al. ............... 455/550.1 |
| 2004/0063441 A1 * | 4/2004 | Diao et al. ............... 455/456.1 |
| 2004/0087273 A1 * | 5/2004 | Perttila et al. ............. 455/41.2 |
| 2004/0117684 A1 * | 6/2004 | Chamberlain ............... 713/401 |
| 2004/0133524 A1 * | 7/2004 | Chamberlain ................. 705/60 |
| 2004/0157622 A1 * | 8/2004 | Needham ................. 455/456.1 |
| 2004/0185900 A1 * | 9/2004 | McElveen ................ 455/556.1 |
| 2004/0198309 A1 * | 10/2004 | Duvall ..................... 455/404.1 |
| 2005/0054351 A1 * | 3/2005 | McAlexander ........... 455/456.1 |
| 2005/0060299 A1 * | 3/2005 | Filley et al. .................... 707/3 |

FOREIGN PATENT DOCUMENTS

| | | |
|---|---|---|
| DE | 100 42 914 A1 | 4/2001 |
| EP | 0 801 512 | 10/1997 |
| WO | WO 97/28736 | 8/1997 |
| WO | WO 97/46960 | 12/1997 |
| WO | WO 99/17230 | 4/1999 |
| WO | WO 00/74406 | 12/2000 |
| WO | WO 01/06507 | 1/2001 |
| WO | WO 01/17297 | 3/2001 |
| WO | WO 01/20542 | 3/2001 |
| WO | WO 01/39103 | 5/2001 |
| WO | WO 01/39108 | 5/2001 |
| WO | WO 01/45319 | 6/2001 |
| WO | WO 01/47291 | 6/2001 |
| WO | WO 01/73687 | 10/2001 |
| WO | WO 01/99410 | 12/2001 |
| WO | WO 02/35773 | 5/2002 |

* cited by examiner

| TAG ID | IMAGE | STAMP |
|---|---|---|
| 35899231344469 | ESPA | CLOCK+WATERMARK |
| 35772394620012 | MARKET PLACE | CLOCK |
| 35663899045623 | HARBOUR | CLOCK |
| 35440023577176 | CITY HOUSE | CLOCK |
| ... | ... | ... |
| 35980221023325 | CHURCH | CLOCK |

| NAME | ADDRESS | PHONE NUMBER | MMS CAPABILITY? |
|---|---|---|---|
| NAME-1 | ADDRESS-1 | PHONE NUMBER-1 | YES |
| NAME-2 | ADDRESS-2 | PHONE NUMBER-2 | YES |
| NAME-3 | ADDRESS-3 | PHONE NUMBER-3 | YES |
| NAME-4 | ADDRESS-4 | PHONE NUMBER-4 | NO |
| ... | ... | ... | ... |
| NAME-N | ADDRESS-N | PHONE NUMBER-N | YES/NO |

SYSTEM AND METHOD FOR ASSOCIATING POSTMARK INFORMATION WITH DIGITAL CONTENT

FIELD OF THE INVENTION

This invention relates in general to mobile communications, and more particularly to a system and method for facilitating the creation of postcards initiated by mobile device users.

BACKGROUND OF THE INVENTION

Advances in communication infrastructures and devices have turned standard communication devices into valuable tools. People communicate with each other, and with other electronic devices, over networks ranging from Local Area Networks (LANs) to wide reaching Global Area Networks (GANs) such as the Internet. Wireless communications devices such as mobile phones, Personal Digital Assistants (PDAs), and the like are often designed to interface with such networks as well as with their local surroundings using short-range wireless technologies.

Today, such wireless devices are being used for a variety of different types of communication, as well as the creation of original content. For example, current and anticipated mobile phone technologies have transformed wireless devices into powerful tools capable of capturing and communicating voice, data, images, video, and other multimedia content. Mobile phones, at one time solely a voice communication tool, now often include digital photographic, video, and audio recording capabilities along with network communication capabilities such as e-mail and World Wide Web browsing.

Digital content, such as still pictures, audio, video and other multimedia, can be captured and transmitted via these communications devices and infrastructures. Such features are particularly useful to vacationers and other travelers, as a single communication device such as a mobile phone can be carried instead of also carrying cameras, video cameras, etc. These multi-feature communication devices provide another significant convenience to the user, which is the ability to create such content and immediately transmit the content to friends, family, or other desired recipients.

However, because such a large volume of content is already accessible to mobile device users due to the global reach of mobile and landline networks, a recipient of a multimedia message may not know whether the image was actually created by the mobile device user, or whether the mobile device user simply retrieved the image from the Internet or other network. The use of conventional postcards does not exhibit this problem, as such conventional postcards are mailed with a post office stamp or other postmark that indicates the general area from which the postcard was mailed (e.g., post office, city, etc.). When a person is traveling, he/she may find mailboxes located at various places where postcards can be mailed and receive a postmark from that location. This is particularly true at tourist/vacation areas, where such mailboxes may be placed at strategic locations to assist travelers. The traveler purchases a postcard, writes any greetings and address, places a stamp on the postcard, and places the completed postcard in a mailbox. The postcard will be stamped with a particular postmark, and the receiver of the postcard will see that the traveler has actually been at that location.

As can be seen from the foregoing, using conventional postcards may be inconvenient to travelers. When the traveler is in a new place, he/she may need to find a new place to purchase stamps, will need to find a pen, etc. Generally, the traveler puts such tasks off until a later time, and then purchases many postcards and completes them all at one time. In other words, it is also difficult for travelers to be spontaneous in sending conventional postcards. Further, while the advent of multimedia-capable communication devices has created many conveniences to travelers, there is no way to prove or otherwise establish where a picture was taken, and there is little flexibility in the manner in which such pictures may be provided to recipients.

Individuals other than travelers and vacationers may also need to establish where they were, or when they were at a location. For example, many workplace situations involve scheduled appointments, service events, mandatory regulatory checks, or other events where proof of attendance or compliance may be beneficial, or even required. For example, a worker may be tasked with maintaining service points in various geographic locations, and is often on the road to accomplish such tasks. Due to regulatory requirements, employment accountability or other reasons, the worker may need to establish evidence of his/her whereabouts or task status. Currently, there is no convenient manner of providing this information, or to easily confirm the veracity of the worker's affirmations of compliance.

The present invention provides a solution to these and other shortcomings of the prior art, and provides many advantages over the prior art.

SUMMARY OF THE INVENTION

To overcome limitations in the prior art described above, and to overcome other limitations that will become apparent upon reading and understanding the present specification, the present invention discloses a system and method for providing postmark information on digital content.

In accordance with one embodiment of the invention, a method is provided for marking content at a mobile device. The method includes obtaining content at the mobile device. For example, the mobile device may receive the content from a kiosk or other content-supplying device, or the mobile device user may create the content via the mobile device itself. The mobile device receives postmark information particular to a predetermined vicinity from at least one transponder located at the predetermined vicinity. At least some of the postmark information from the transponder is then associated with the content. In this manner, the content can be marked such that it allows a recipient of the content to know where and/or when the mobile device user was when the content was sent to the recipient.

In accordance with another embodiment of the invention, a method for creating postcards involving a network service is provided. Information is received at a mobile device from at least one transponder or "tag," where the information includes at least a tag ID. A message is created at the mobile device, where the message includes at least the tag ID. The mobile device sends the message to a network service that will facilitate the creation of a postcard. Postmark information associated with the particular tag ID sent from the mobile device is located at the network service. The postmark information may include, for example, static information such as a location as well as dynamic information such as date and time. Using this postmark information, a content item such as a digital image can be marked with the postmark information to create a digital postcard.

According to a more particular embodiment of such a method, the content item may also be located at the network service based on the received tag ID. For example, the user may select a particular image to be used with the digital postcard, and by way of the selection a particular tag ID is provided to the user to include with the outgoing message to the network service. In another embodiment, the user may create the content, and include the created content in a multimedia message to the network service. In another particular embodiment, one or more destination addresses of intended recipients of the digital postcard are included in the message to the network service, and the digital postcard is delivered from the network service to the destination addresses of the intended recipients. These destination addresses may be network addresses where the digital postcard is sent electronically, or may be physical addresses where a printed copy of the digital postcard can be mailed in which case postage may also be included. In still another particular embodiment, the information received from the tag further includes a network address of the network service, and the message is then delivered to that network address. In another particular embodiment, the information received from the tag further includes an application identifier (ID), and when the mobile device receives this application ID, it invokes a messaging application corresponding to the received application ID. In still other embodiments, the user may also submit a text message with the message delivered to the network service, which can then be included on the digital postcard. Such a text message may be in the form of an electronic text message using established fonts of the electronic device, or alternatively may correspond to the user's handwriting using a handwriting profile associated with the user.

In accordance with another embodiment of the invention, a method is provided for creating postcards with the assistance of a kiosk. A plurality of selectable content items is provided at a kiosk located within a vicinity, where each of the selectable content items relates to that vicinity and each includes a respective content identifier. Information is transmitted to a mobile device from at least one transponder that may be located at the kiosk, where the information includes at least the content identifier of a user-selected content item. A message is created at the mobile device to include the content identifier, and the message is delivered to a network service. The user-selected content item is identified at the network service based on the content identifier. A postmark is then associated with the identified user-selected content item to create the postcard.

In accordance with another embodiment of the invention, a method is provided for creating postcards via a stand-alone postcard generation unit. In one embodiment, the method includes providing at least connection information to a mobile device via an activated radio frequency (RF) transponder. A message is received from the mobile device via a connection established using the connection information, where the message includes at least one image and a text message. A postmark is identified based on an identifier provided by the activated RF transponder. A postcard is created that includes the image, text message, and the postmark.

According to more particular embodiments of such a method, the text message may be created via a user interface (UI) at the mobile device. In a more particular embodiment, the text message is converted to a handwriting message corresponding to handwriting of the mobile device user. This may be accomplished, for example, by indexing a handwriting-text conversion library to identify handwriting counterparts of the created text message. In one embodiment, creating the handwriting-text conversion library is accomplished using a conversion engine that receives the user's handwriting as input, such as via a digital pen, and that associates relationships of handwriting and textual counterparts.

In accordance with another embodiment of the invention, a system is provided for creating postcards that includes an RFID tag to provide at least a tag ID in response to a reader activation signal. A mobile device includes a digital camera to create a digital image, and further includes an RFID reader to provide the reader activation signal and to receive the tag ID. The mobile device also includes a message application, such as an MMS, SMS, or other message application to provide a message including the tag ID and the digital image. A server is coupled to receive the message from the mobile device via a network, where the server includes a database of tag IDs and respectively associated postmarks. The server includes a processing module configured to identify the postmark from the database that is associated with the tag ID provided in the message, and to create a digital postcard including the digital image and the postmark.

In accordance with another system according to the present invention, a postmark kiosk is provided that includes at least one RFID tag to provide at least a tag identifier (ID) in response to a reader activation signal. A mobile device includes an RFID reader to provide the reader activation signal and to receive the tag ID, and further includes a message application to provide a message including at least the tag ID. A server is provided to receive the message from the mobile device via a network, where the server includes a database of tag IDs and respectively associated postmarks and images, and a processor configured to identify the image and postmark from the database that are associated with the tag ID provided in the message, and to create a digital postcard including the identified image and postmark.

In accordance with another embodiment of the invention, a system is provided for creating postcards, where the system includes an RFID tag to provide connection information to a mobile device in response to an RFID activation signal. The system includes a wireless communication interface to receive a message including at least one image and a text message from the mobile device over a connection established using the connection information. A processing module is configured to create a digital postcard including at least the image, the text message, and a postmark, and a printer is provided to print the resulting postcard.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention involves a manner of providing digital postcards or other similar media to users of mobile devices. The invention utilizes short-range wireless communication technologies to provide information to the mobile devices that can be used to facilitate the postcard generation and delivery process. One such communication technology includes Radio Frequency Identification (RFID), where transponders or RFID "tags" are used to provide various information to the mobile devices. Official post office postmarks, or unofficial postmarks, may be applied to content such as pre-established selectable images/video or mobile device-created images/video to authenticate the user's whereabouts when obtaining the images. Thus, as an official post office postmark authenticates the post office from which an item is mailed, the digital postmark (whether official or unofficial) applied to wirelessly transmitted digital content can provide authentication that the user obtained/created the image at the place corresponding to the postcard. Various representative embodiments for performing these and other aspects of the present invention are described in the ensuing description.

In many tourist areas, mailboxes are often provided to allow people to leave a physical postcard or other correspondence for mailing. Postcards placed in such mailboxes will be stamped with a postmark corresponding to that location or vicinity. For example, a person may purchase a postcard when visiting the Grand Canyon, include an address of an intended recipient and perhaps a message, place postage on the postcard, and place the completed postcard in a mailbox provided at the Grand Canyon tourist areas. When the postcard is provided with a postmark, it may include information such as the date, and a location indicator such as the city, state, country, or other indicator such as "The Grand Canyon." When the targeted recipient receives the postcard, he/she will readily recognize the sender's actual presence at that location from the postmark information. However, this process is not always convenient to travelers, as they need to physically purchase the postcard, obtain a stamp or other postage, have a pen available, etc. These inconveniences may serve as a disincentive for travelers to send postcards, even though they would like to do so.

Figure 1:
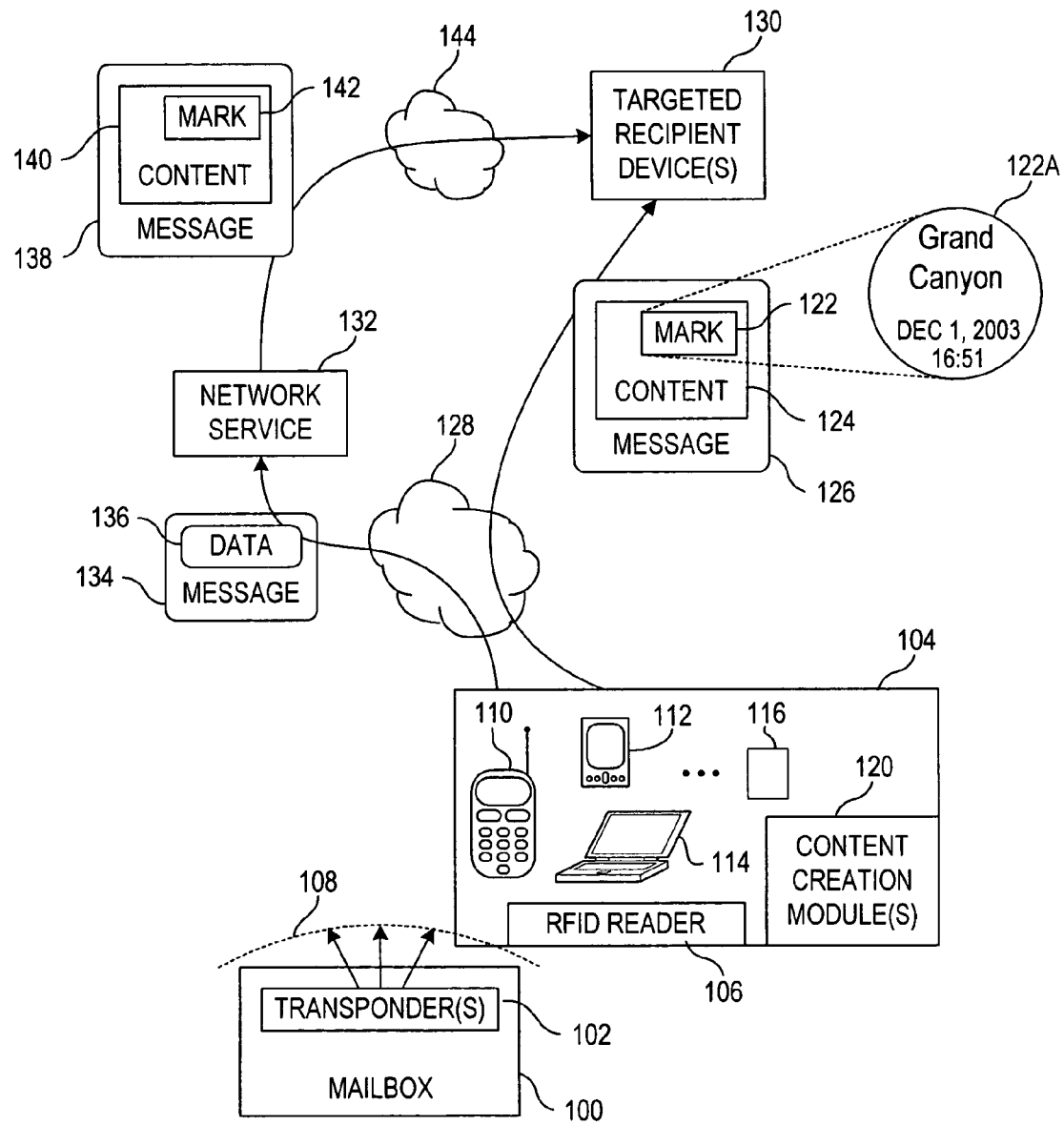
FIG. 1 is a block diagram illustrating one embodiment of a manner of applying postmark information to content in accordance with the present invention.

The present invention provides a solution to these and other shortcomings of conventional correspondence delivery for tourists, travelers, or others who may send postcards or other correspondence. The present invention contemplates numerous alternative implementations to enhance the convenience and flexibility of selecting, creating, and/or authenticating correspondence to intended recipients. FIG. 1 is a block diagram illustrating one such embodiment, where postmark information is applied to content in accordance with the present invention.

As shown in FIG. 1, a mailbox(es) 100 or other item(s) may be provided. The mailbox 100 may be a mailbox that is also available for travelers to place physical postcards, or may be specially provided for use with the present invention. Associated with the mailbox 100 or other similar item is at least one transponder 102. According to one embodiment of the present invention, the transponder is based on Radio Frequency Identification (RFID) technology which utilizes electromagnetic or electrostatic coupling in the radio frequency (RF) portion of the electromagnetic spectrum. In the RFID context, a mobile device 104 is equipped with an RFID reader 106, and transponders or "tags" are activated by radio frequency waves emitted by the RFID reader 106 associated with the mobile device 104. When activated, the tag 102 transmits information to the mobile terminal reader 106.

More particularly, an RFID reader 106 generally includes an antenna and transceiver (not shown in FIG. 1). An RF signal is transmitted from the RFID reader 106 that activates the tag 102 when touched to, or within a predetermined range of, the tag 102. It should be noted that the description provided herein may make reference to "touching" an RFID tag, but this is intended to imply being within the wireless transmission range of the RFID tag such that communication may be effected. When a tag has been activated in accordance with the invention, it transmits information back to the RFID reader 106. In the case of a passive tag (described below), the tag 102 may be energized by a time-varying electromagnetic RF wave generated by the RFID reader 106. When the RF field passes through the antenna coil associated with the tag 102, a voltage is generated across the coil.

This voltage is ultimately used to power the tag 102, and make possible the tag's return transmission of information to the reader 106, sometimes referred to as "backscattering."

Using this information, the RFID reader 106 can receive information and/or direct the mobile device 104 to perform an action identified from the received information. One advantage of RFID is that it does not require direct contact, although direct contact with an RFID tag can occur, and in some instances may be required or otherwise desirable. The frequency employed will at least partially dictate the transmission range of the reader/tag link. The required proximity of the mobile terminal 104 to a tag can range from a very short range (touching or near touching) to many meters, depending on the frequency employed and the power output. The RFID tag 102 shown in FIG. 1 depicts a range 108 for that RFID tag 102, for purposes of illustration. For example, when the reader 106 of the mobile device 104 comes within a range 108 of RFID tag 102, the tag 102 can receive the signal from the RFID reader 106 and respond with the desired information. It should be noted that one embodiment of the invention involves a tag having substantially no transmission range, but rather may include contacts that physically couple to corresponding contacts on the mobile terminal 104.

Any type of RFID tag may be used in connection with the present invention. For example, RFID tags can be either active or passive. Active tags require an internal battery and are often read/write tags, where the tags are coupled to a memory device that enables dynamic change of the tag contents. Passive tags do not require a dedicated power source, but rather obtain operating power generated from the reader device. Further, tags may come in a variety of shapes and sizes, but are generally based on a custom designed silicon integrated circuit. Any transponder/tag may be used in connection with the present invention, and the tag type, size, etc. depends on the particular environment and purpose associated with the postcard system being employed.

Any mobile device 104 equipped with such a reader 106 and having wireless network communications capabilities may be used in connection with the present invention. Such mobile devices 104 may include, for example, mobile phones 110, Personal Digital Assistants (PDAs) 112, portable computing devices 114, or other 116 wireless communication devices. Further, in accordance with one embodiment of the present invention, the mobile device 104 includes one or more content generation modules 120, such as a still-shot camera, video camera, or other media/multimedia generation device.

A first operational scenario is now described in connection with FIG. 1. Assume a traveler is at a location, such as the Grand Canyon. The traveler takes a picture of scenery in the area using his/her camera-equipped mobile device 104, and wants to send the image as a postcard to one or more friends. The device user also wants to establish that he/she was actually at the place where the picture was taken. In accordance with one embodiment of the invention, the tag 102 stores postmark information, including information such as an identification (ID) of the tag 102 such as "Grand Canyon," the date, time, geographic coordinates, etc. When the user touches the mobile device 104 and consequently the RFID reader 106 to the tag 102, or otherwise brings the mobile device 104 within a transmission range 108 of the tag 102, the RFID reader 106 can receive RF signals providing the postmark information. At the mobile device 104, this postmark information (i.e., MARK) 122 can be placed on or otherwise associated with the image/content 124. A representative example of such a mark 122A may include the vicinity associated with the tag 102 (e.g., Grand Canyon) as well as the date and time. The marked image 124 can then be sent via a network 128 (which may include mobile and landline networks) to one or more targeted recipients 130 using any type of transmission message 126 such as e-mail, Multimedia Messaging Service (MMS) messages, or other messaging technology capable of transmitting rich content.

Another representative operational scenario involves the use of a network service 132. Similar to the previous example, the user takes a picture in the area using his/her camera-equipped mobile device 104, and wants to send the image as a postcard to one or more friends. In this embodiment, the tag 102 stores information used in invoking one or more applications on the mobile device 104. Such information may include an application ID, such as an identifier instructing the mobile device 104 to invoke an MMS application. In response to touching (or bringing within a wireless transmission range of) the tag 102, MMS message options may automatically be invoked in the user interface (UI) of the mobile device 104. The user can then attach the created picture to the message 134, and add a recipient destination (s). The message 134 that includes this data 136 (e.g., picture, recipient addresses, etc.) is sent to the network service 132. An address of the network service 132 may also be provided via the tag 102, so that the MMS message or other message 134 is directed to the proper network address. In this embodiment, the network service 132 applies the appropriate postmark information, based on tag 102 ID information provided with the data 136. For example, a table or other data structure residing at or otherwise accessible to the network service 132 can include a list of corresponding tag IDs and postmarks, and when the network service 132 receives a particular tag ID, it can identify the appropriate postmark to be associated with the received content. The resulting message 138 including the content 140 and postmark 142 can then be sent to the targeted recipient(s) 130 via landline and/or wireless networks 144.

It should be noted that the network service 132 may be a private service, or affiliated with government mail services. The postmark may therefore be an unofficial stamp that provides postmark-like information, or may be an official postmark from a private or governmental agency. In the latter case, the postmark may also include a postage amount where the resulting postmarked postcard is to be mailed via standard postal avenues or via networks. For example, a national postal service may receive requests for postmarking digital data, and may bill the initiating user for postage and/or service fees. These costs may optionally be associated with the postmark information. Such costs may be billed in a traditional manner, or may be effected over the network. For example, the user may be charged by the network operator who maintains charging and billing systems that can be used by the network service 132.

Figure 2:
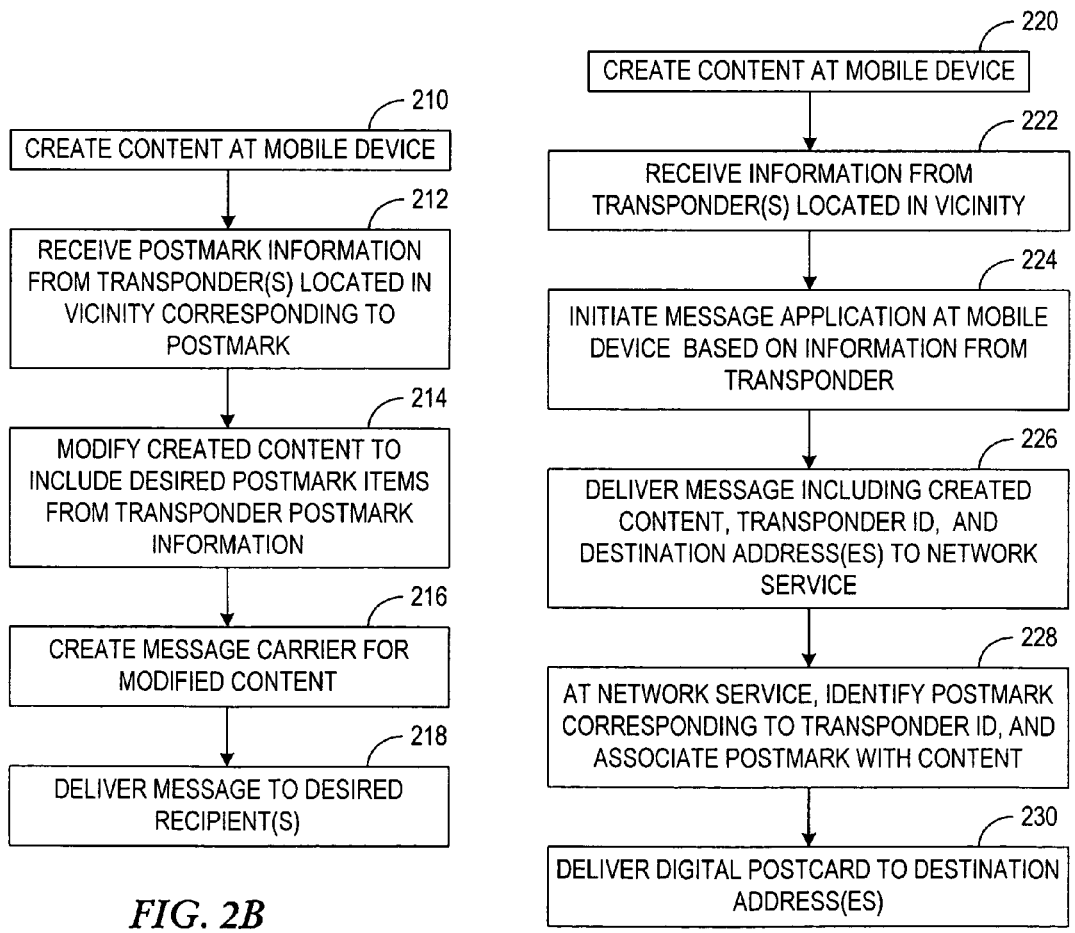
FIGS. 2A, 2B and 2C are flow diagrams illustrating various representative embodiments for associating postmark information with user-created content in accordance with the present invention.

FIGS. 2A, 2B and 2C are flow diagrams illustrating various representative embodiments of manners for including postmark information with digital content in accordance with the present invention. The content may be an image, video, etc. In the embodiment of FIG. 2A, content is created 200 at the user's mobile device although the content may be obtained in different manners, such as via a kiosk as subsequently described. The mobile device user receives 202 postmark information from at least one transponder/tag that is located in the vicinity corresponding to the postmark information. For example, if the tag is co-located with a mailbox at the Grand Canyon, the postmark information may identify the Grand Canyon as a location. Then, at least some of the received postmark information is associated 204 with the created content. For example, the postmark information may include the location "Grand Canyon," the date, and the time. At least some of this information, such as the location name and the date, may be placed on or otherwise associated with the content created at the mobile device.

FIG. 2B is a flow diagram illustrating a more particular embodiment for associating postmark information with content in accordance with the invention. Content is created 210 via the user's mobile device, and postmark information is received 212 via a tag. The content is modified 214 at the mobile device to include one or more desired postmark items included with the postmark information received from the tag. A message carrier is created 216 for the modified content, where the message carrier may be any type of message capable of carrying rich content such as a MMS message. The message may then be delivered 218 from the mobile device to one or more desired recipients of the message.

FIG. 2C is a flow diagram illustrating another particular embodiment for associating postmark information with content in accordance with the invention. Content is again created 220 at the mobile device, and information is received 222 from the tag/transponder(s) located in that vicinity. In this embodiment, the information received from the tag includes information to initiate a message application at the mobile device, such as an application ID. A message application is initiated 224 at the mobile device based on the information (e.g., application ID) from the tag. The message is delivered 226 from the mobile device to a network service. In one embodiment the message includes the created content, a tag ID, and one or more destination/recipient addresses. The information to initiate the application and the tag ID are received from the tag, and the tag may also provide the address of the network service to which the message is to be sent. The user provides the created content and the destination/recipient addresses in this example. At the network service, the transponder ID is used to identify the appropriate postmark, and the postmark is then applied to or associated with the content as shown at block 228. The resulting postcard is then delivered 230 to the recipients identified by the destination/recipient addresses.

Figure 3:
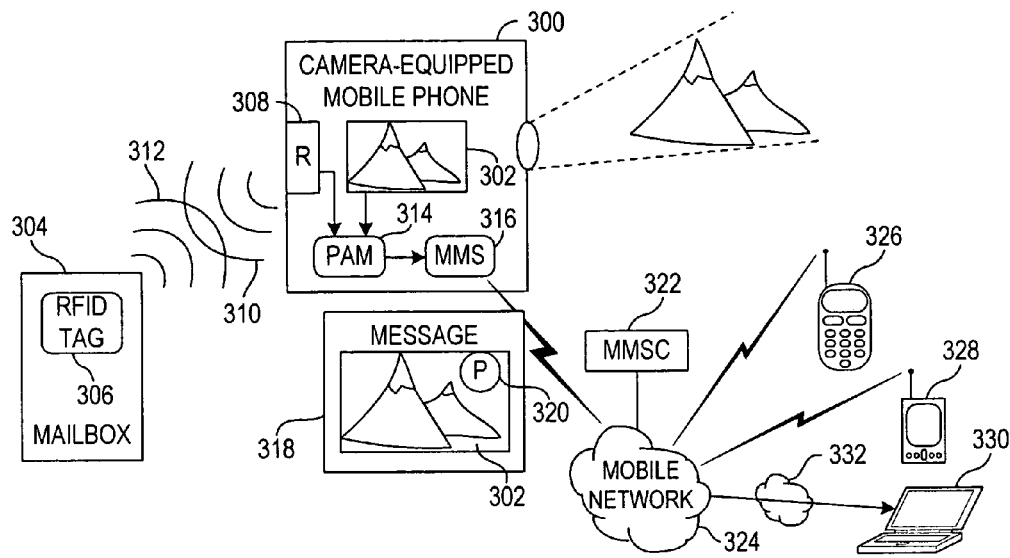
FIG. 3 is a block diagram illustrating one embodiment for associating a postmark with user-created digital content in accordance with the present invention.
Figure 4:
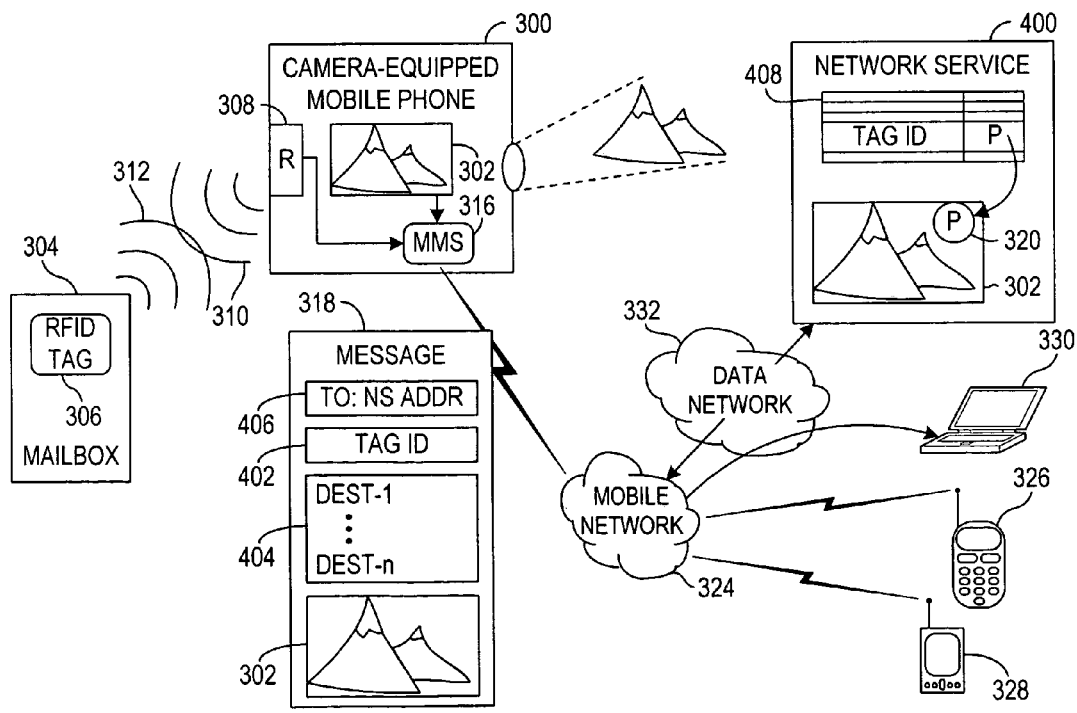
FIG. 4 is a block diagram illustrating a network server-assisted embodiment for associating a postmark with user-created digital content in accordance with the present invention.

FIGS. 3 and 4 illustrate particular embodiments for associating a postmark with user-created digital content in accordance with the present invention. In FIG. 3, the mobile device is depicted as a camera-equipped mobile phone 300, from which the user takes a picture 302. A mailbox 304 is provided within a vicinity associated with the subject of the picture 302. In the illustrated embodiment, the mailbox is provided with a passive RFID tag 306 that includes postmark information associated with that vicinity. The user activates the RFID reader (R) 308 device in the mobile phone 300, which sends an RF activation signal 310 to the RFID tag 306. The RFID tag 306 is activated, and retrieves stored information from an embedded memory (not shown). The activated RFID tag 306 responds with an RF signal 312 that includes the stored information, which in the present example includes the postmark information. The reader 308 receives the information, and a postmark association module (PAM) 314 modifies the image 302 to include the postmark. In the illustrated embodiment, the mobile phone 300 opens an MMS application 316, creates an MMS message 318 with the image 302 and postmark 320, and sends the message 318 to an MMS Center (MMSC) 322 via a mobile network 324. Using standard MMS procedures, the MMSC 322 directs the message 318 to the intended recipient(s) 326, 328, 330 based on one or more destination addresses provided via the MMS message 318. The message may be transmitted via the mobile network(s) 324, or may also include a data network 332 to deliver the message to landline systems 320. In this manner, the recipients 326, 328, 330 receive a user-created postcard that is postmarked with information verifying that the user took the picture at the vicinity associated with the subject of the picture. It should be noted that the message 318 may be transmitted via other means, such as Enhanced Messaging Service (EMS), e-mail, etc.

The embodiment of FIG. 4 is similar to that of FIG. 3, except that a network service 400 is used to facilitate the postmarking process. Like reference numbers are used in FIG. 4 for common items discussed in FIG. 3. In this embodiment, the activated RFID tag 306 provides stored information to the reader 308 including a message initiation indication, such as an application ID to open an MMS application at the mobile phone 300. In response, the MMS application 316 is invoked in response to this information. Alternatively, the user may open the MMS application where such message initiation indication is not provided by the RFID tag 306.

The RFID tag 306 also provides a tag ID or other unique indicator that corresponds to the particular tag location that can be used to ultimately create the postmark. An MMS message 318 is created, that includes such a tag ID 402. The user then includes the picture 302 (or other created content), and also includes the destination addresses 404 to whom the message 318 is ultimately to be delivered. The RFID tag 306 may also provide the address of the network service 400, or the user may enter such an address directly or select a saved address (e.g., bookmark). Such network service address (NS ADDR) 406 is used to route the message 318 to the network service 400 through the mobile network 324, and through a data network 332 where the network service 400 is coupled to a data network 332 such as the Internet.

At the network service 400, a table 408 or other list of corresponding tag IDs and postmarks (P) are provided. Using the tag ID 402 received with the message 318, the network service can identify the postmark that corresponds to that tag ID 402 and consequently to the location/vicinity associated with the mailbox 304 where the information was originally received. The network service 400 places the identified postmark 320 on the picture 302, and delivers the resulting postcard to the recipients 326, 328, 330 identified by the destination addresses 404. One benefit of this embodiment is that the mobile device 300 does not need the software and/or hardware to associate postmarks with created content—rather the mobile device 300 only needs the RFID reader 308 and an MMS 316 or other messaging module to initiate the delivery of postcards in accordance with the invention.

As previously indicated, some embodiments of the present invention involve the use of one or more network services to assist in the postcard postmarking process. FIG. 4 illustrates on such example, where the user creates content and utilizes a network service to facilitate the postmarking process. In other embodiments of the invention, a network service is used in the postmarking process, but the user need not create the image, video, or other content used as the basis for the postcard. Rather, the user may select a predefined image, video, or other content from one or more selectable content items. For example, a kiosk or other mechanism may be provided that presents one or more available postcard images, video, etc. The user can select the desired content from the kiosk for use with the resulting postcard. In some embodiments, the selected content itself may be transmitted from the kiosk to the mobile device via the RFID tag or other short-range wireless technology such as Bluetooth, Wireless Local Area Network (WLAN), or the like. In other embodiments, an identifier of the selected content item(s) is transmitted from the kiosk to the mobile device, which can then be used by a network service to identify the appropriate image, video, or other content to be used in connection with the postcard. A number of representative kiosk-based embodiments of the invention are described below.

Figure 5:
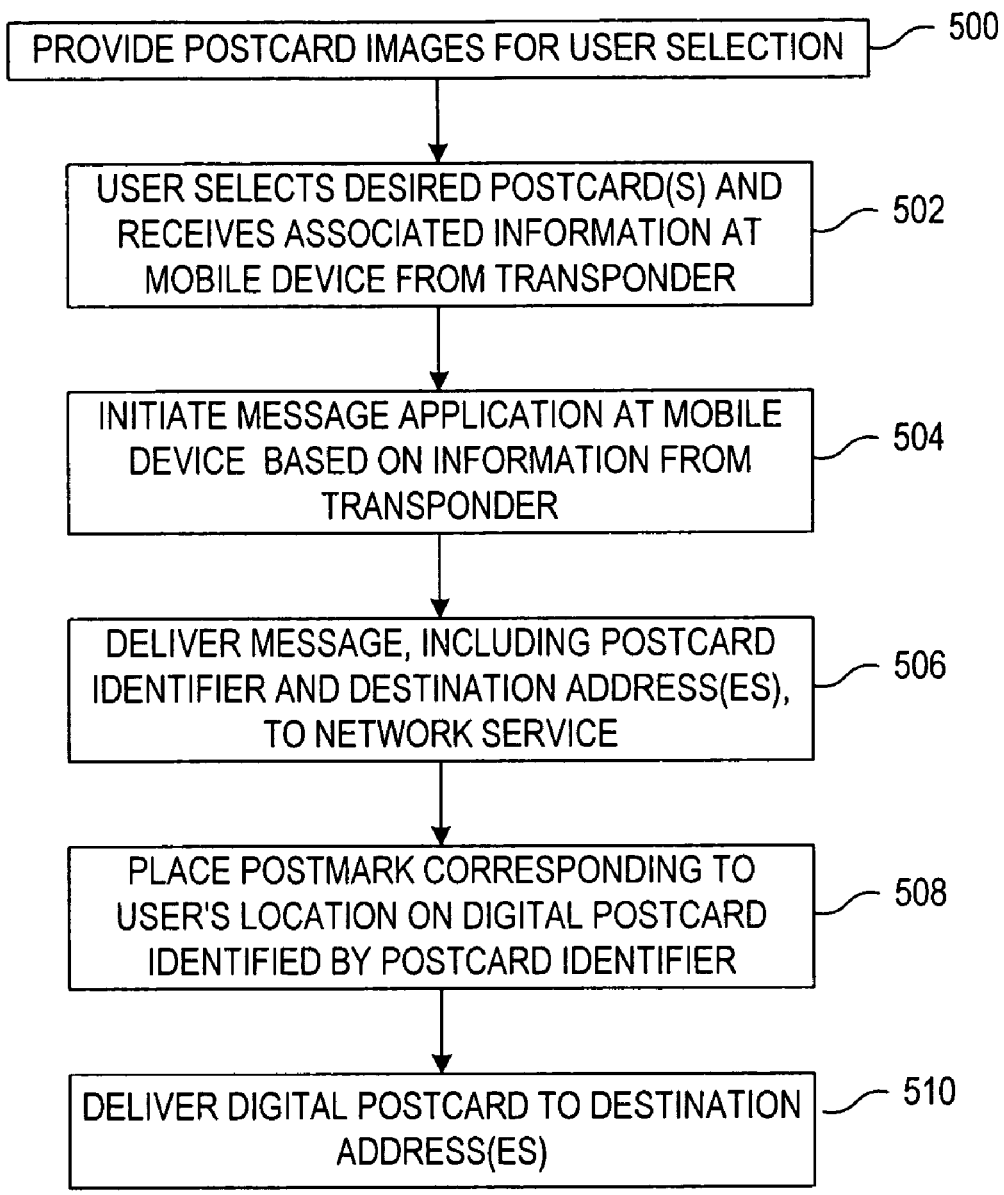
FIG. 5 is a flow diagram of one embodiment of the invention where a postmarked postcard is created without the need for the user content creation.

FIG. 5 is a flow diagram of one embodiment of the invention where a postmarked postcard is created without the need for the user to create the content at his/her mobile device. In this embodiment, one or more postcard images are provided 500 for user selection. These images may be provided via a kiosk or other computer-based system available to users in a particular vicinity. The user selects 502 one or more desired postcards from the postcard system, and receives associated information at the mobile device via a short-range wireless transmitter, such as a transponder (e.g., RFID tag).

The information received from the tag depends on the particular implementation. For example, one embodiment involves directly sending the selected postcard image (or other content) to the mobile device. Such an embodiment may be beneficial where the content is transmitted via a short-range transmission technology such as Bluetooth. Alternatively, RFID tags may include memory of sufficient size to store digital postcards, in which case the content may be provided to the mobile device via the RFID tags. For example, in one embodiment, a different RFID tag may be associated with each selectable image in a postcard kiosk. When the user touches the desired postcard with his/her RFID-enabled mobile device, the respective activated RFID tag may deliver the selected digital postcard to the mobile device. In another embodiment, the user may physically select the desired postcard via a kiosk, such as pressing a button corresponding to the desired postcard image on the kiosk. In this case, a switching mechanism may switch the appropriate memory to a single RFID tag, and the user then touches the RFID-enabled mobile device to the single RFID tag to receive the image (or image identifier) corresponding to the selected postcard.

In other embodiments, the kiosk or other computer-based system may not provide the digital content of the selected postcard, but rather may provide a content "identifier." For example, where the user selects "postcard-3" from the kiosk and touches the RFID-enabled mobile device to the appropriate RFID tag on the kiosk, an identifier that corresponds to "postcard-3" is transmitted to the mobile device rather than the actual image corresponding to "postcard-3."

Referring again to FIG. 5, the RFID tag (or using another wireless transmission technology) provides various information to the mobile device. In the illustrated embodiment, this information includes a message initiation indicator such as an application identifier. A message application is initiated 504 at the mobile device based on this information. For example, the mobile device may open an e-mail application, MMS application, etc. In the illustrated embodiment, the RFID tag provides a postcard identifier to the mobile device rather than the postcard content itself. Therefore, the message is created such that it includes at least the postcard identifier and recipient/destination addresses, which is then delivered 506 to the network service.

The network service receives the message, and using the postcard identifier can identify the postcard that was selected by the user. The postcard identifier may also identify the appropriate postmark—i.e., a postcard identifier of "12345" may identify a particular predetermined image of the Grand Canyon, and may also identify a postmark associated with the vicinity where the user selected the image at the kiosk. In another embodiment, a tag ID or other unique identifier may be used independently of the postcard identifier to identify the postmark. In any case, the one or more identifiers provided from the RFID tag to the mobile device, and then delivered via a message(s) to the network service, are used by the network service to identify the postcard and postmark. The network service places the appropriate postmark on the selected postcard as shown at block 508, and the resulting postcard is delivered 510 to the destination address (es) identified in the user's message to the network service. As will be shown in subsequent embodiments, the resulting postcard may also be delivered to a printing site where a physical postcard is created and sent through standard post to one or more of the intended recipients.

Figure 6:
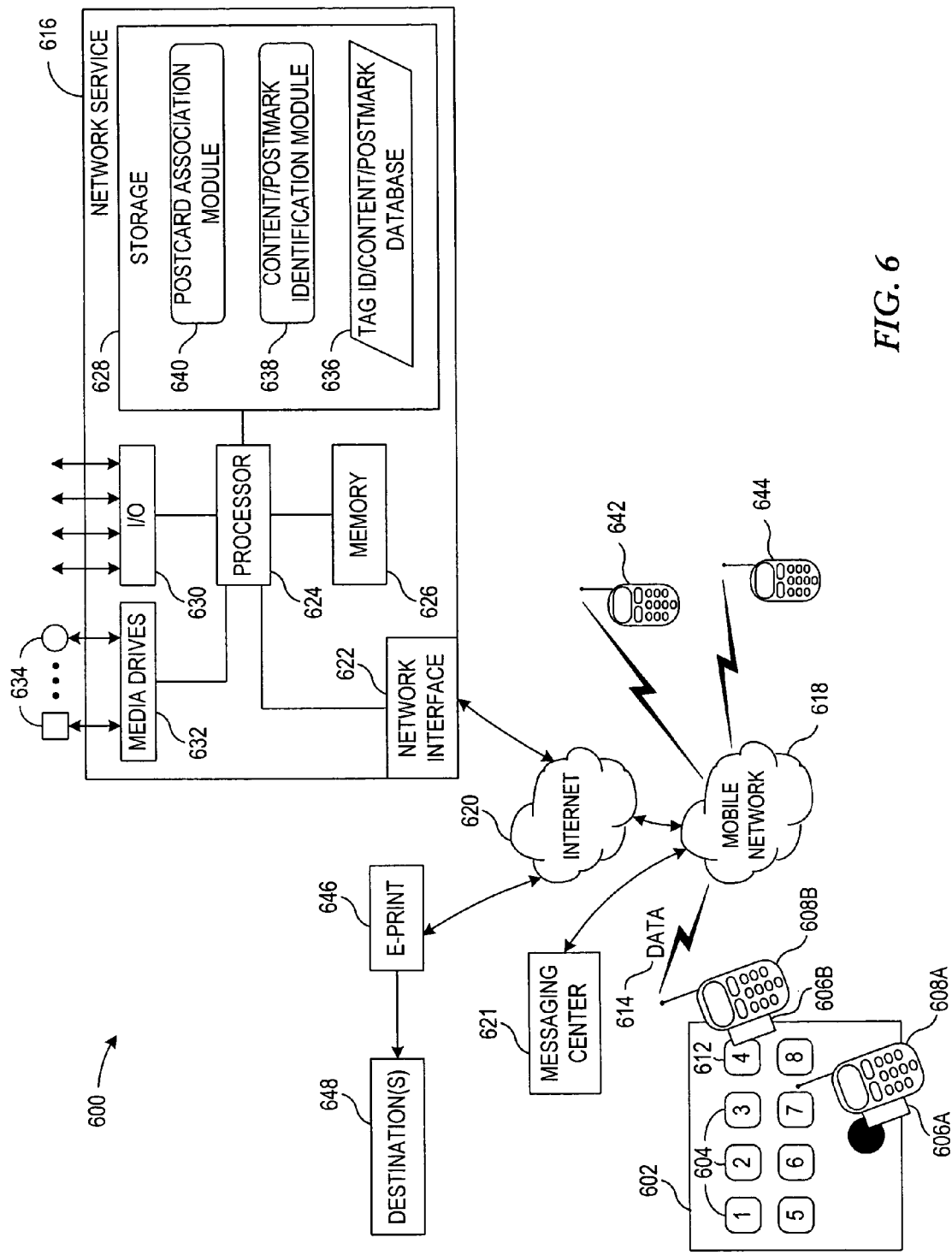
FIG. 6 is a block diagram of an exemplary system architecture involving a postcard kiosk and postmarking network service in accordance with one embodiment of the present invention.

FIG. 6 is a block diagram of an exemplary system architecture 600 involving a postcard kiosk and postmarking network service in accordance with one embodiment of the present invention. Assume a mobile device user is walking through a city, tourist area or other vicinity, and finds an area of interest such as a marketplace. The user finds a mailbox, kiosk, or other item identifying it as a unit for obtaining postcards. In the illustrated embodiment, the unit is shown as a kiosk 602 that identifies one or more postcards 604 available for selection, where the postcards preferably include different images of the area that the user is located— the marketplace in this example. In one embodiment of the invention, the user touches the RFID reader 606A of the mobile device 608A to a predefined area 610 associated with an RFID tag (not shown). In such an embodiment, the user can later designate which of the available postcards 604 is desired. Alternatively, each of the available postcard selections 604 may be associated with its own RFID tag, such that the reader device 606B of the mobile device 608B is positioned proximate the desired postcard 612 and consequently proximate to the corresponding RFID tag. In such a case, the postcard-specific RFID tag can transmit the tag/ picture ID associated with the selected postcard 612. In either case, some identifier will be transmitted as part of the data 614 to the network service 616 to ultimately identify the selected image(s), as described more fully below.

The information provided from the activated tag to the mobile device 606A/B may include a messaging identifier to prompt the mobile device 606A/B to open a corresponding messaging application, such as a Short Message Service (SMS) application, EMS application, MMS application, e-mail application, or the like. Alternatively, the received tag ID may initiate a connection to the mobile network 618 to provide the mobile device 606A/B with messaging application settings, an embodiment of which is described more fully below. However, for purposes of the description of FIG. 6, it is assumed that mobile device 606B receives information to open an MMS application.

When the messaging application has been opened at the mobile device 606B, the user can include relevant information in the message. For example, in an embodiment where the image itself is provided via the kiosk via RFID, Bluetooth, or other short-range wireless technology, the desired image(s) may be attached to the message. In the illustrated embodiment, it is assumed that a picture ID or tag ID is provided to the mobile device 606B rather than the image itself, and this tag ID is included in the message. The information from the RFID may also include an address of the network service 616 to which the mobile device 608B will be sending the message to. The user may also attach a text message that will be included on the resulting postcard. Such a message may be entered via the UI of the mobile device 608B, which may include an alphanumeric keypad, graphical user interface, voice activated entry, digital pen entry, or the like.

When the message creation is complete, the user may send the message with the relevant data 614 to the network service 616 via the mobile network 618, which may in turn communicate via a data network such as the Internet 620 to reach the network service 616. For example, the message may be sent as an SMS, MMS or other message which utilizes the services of a messaging center 621 (e.g., SMSC, MMSC, etc.). The message is received via the network interface 622 of the network service 616. The network service may be implemented using a server or other computer-based system. Hardware, firmware, software or a combination thereof may be used to perform the postcard service functions and operations in accordance with the invention. The representative network service 616 system suitable for performing various postcard service in accordance with the invention includes a central processor 624, which may be coupled to memory 626 and/or storage 628. The processor 624 carries out a variety of standard computing functions as is known in the art, as dictated by software and/or firmware instructions. The storage 628 may represent firmware, hard-drive storage, or other types of storage media to store programs such as programmable ROM (PROM), erasable PROM (EPROM), etc. The processor 624 may communicate with other internal and external components through input/output (I/O) circuitry 630. The server 616 may also include one or more media drive devices 632, including hard and floppy disk drives, CD-ROM drives, DVD drives, and other hardware capable of reading and/or storing information. In one embodiment, software for carrying out the operations in accordance with the present invention may be stored and distributed on CD-ROM, diskette, removable memory, or other form of media capable of portably storing information, as represented by media devices 634. These storage media may be inserted into, and read by, the media drive devices 632. Such software may also be transmitted to the server 616 via data signals, such as being downloaded electronically via a network such as the Internet 620, Local Area Network (LAN), mobile network 618, or any combination thereof.

In accordance with one embodiment of the invention, the storage 628, memory 626, and/or media devices 634 store the various programs and data used in connection with the present invention. In the illustrated embodiment, the storage 628 is shown storing the various program modules, operable in connection with the processor 624. One such data module includes the tag ID/content/postmark database 636. The database may be structured in any desired manner, such as a table, register, linked list, or other data structure can store the association of tag IDs, content and postmarks.

Figures 7, 8:
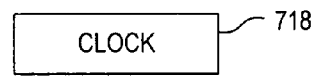
FIG. 7 illustrates a representative database for storing associations of tag IDs and their corresponding images and postmarks.
FIG. 8 illustrates a representative contact/phone book database.

An example of such a database 636 is shown in FIG. 7. This database maintains the list of tags that are recognized by the network service, as well as the corresponding content and postmark or other stamp associated with each tag. More particularly, the representative database 700 includes a tag ID field 702, image (or other content) field 704, and stamp field 706. The database includes a number of records 708, 710, 712, 714, . . . 716. Thus, each tag ID in the illustrated embodiment is associated with an image for use in creating the postcard, as well as a stamp (i.e., postmark) which may include a date/time as provided by the clock 718 and/or a watermark. A date/time may be imprinted on the corresponding image, and for records including a watermark additional indicia may also be provided with the postmark. For example, if the message provided by the mobile device to the network server includes a tag ID 702 as shown in record 708, the image selected to be used for the postcard is a picture of the Esplanadi (Espa) in Helsinki, Finland. The record 708 also indicates that clock data, such as date and/or time, and a watermark that may include indicia such as a geometric symbol and the location (i.e., ESPLANADI, HELSINKI). Similarly, if the received message includes a tag ID 702 as shown in record 712, the image selected is of the harbour, and the stamp/postmark will include clock data.

Returning to FIG. 6, the storage 628 includes a content/postmark identification module 638. This representative module 638 includes one or more programs operable via the processor 624 to perform the indexing of tag IDs to obtain the corresponding content (e.g., image) and postmark data (e.g., clock data, watermark, etc.) using the information in the database 636. Further, the storage 638 may include a postcard association module 640 that associates the postmark with the selected image. For example, the postcard association module 640 may superimpose the postmark on the selected image to create the resulting postmarked postcard. The postcard association module 640 is particularly beneficial in embodiments where the user has created the image, and the tag ID is used to identify the postmark to be applied to the created image. Other manners of associating the postmark with the postcard may also be used, such as printing the information on the front or back of the resulting postcard, where the postcard is printed.

When the network service has identified the selected image and associated the proper postmark with the image, the network service can then deliver the resulting postcard to any targeted recipients 642, 644, etc. For example, an e-mail, SMS, MMS, or other message may be sent that includes the postmarked postcard over the Internet 620 and to the targeted recipients 642, 644 via the mobile network 618. In another embodiment, a physical postcard may be generated via the networked e-print server 646 which can then be delivered to the appropriate destination(s) 648 by facsimile, standard post, etc.

The message provided by the initiating mobile device to the network service, or also in the case where the initiating mobile device directly sends the postcard to the intended recipients, the message may include one or more destination addresses of the intended recipients of the postcard. The user may manually enter such destination addresses, or may locate one or more of such addresses from a contact list or phone book available to the initiating mobile device. For example, the initiating mobile device may include a locally stored phone book database such as that shown in FIG. 8. The illustrated phone book database 800 includes the name 802, address 804, phone number 806, and terminal capabilities 808 of potential recipients. Each potential recipient may be stored as a database record 810, 812, 814, 816, 818, but may be stored in any desired manner. In the illustrated embodiment, the terminal capability 808 represents an indication of whether the recipient terminal has MMS capabilities. For example, the recipient 802 at record 812 (NAME-2) has MMS capability as determined by the MMS capability field 808, while the recipient 802 at record 816 (NAME-4) does not have MMS capability. With this information, the user of the mobile device and/or an intermediary network service will know whether a resulting postcard may be sent via MMS, or whether other delivery options must be considered. In another embodiment, the terminal capabilities of potential recipients may be in a register/database of the network subscribers which can be used by a postmark service to retrieve such terminal capabilities.

Figure 9:
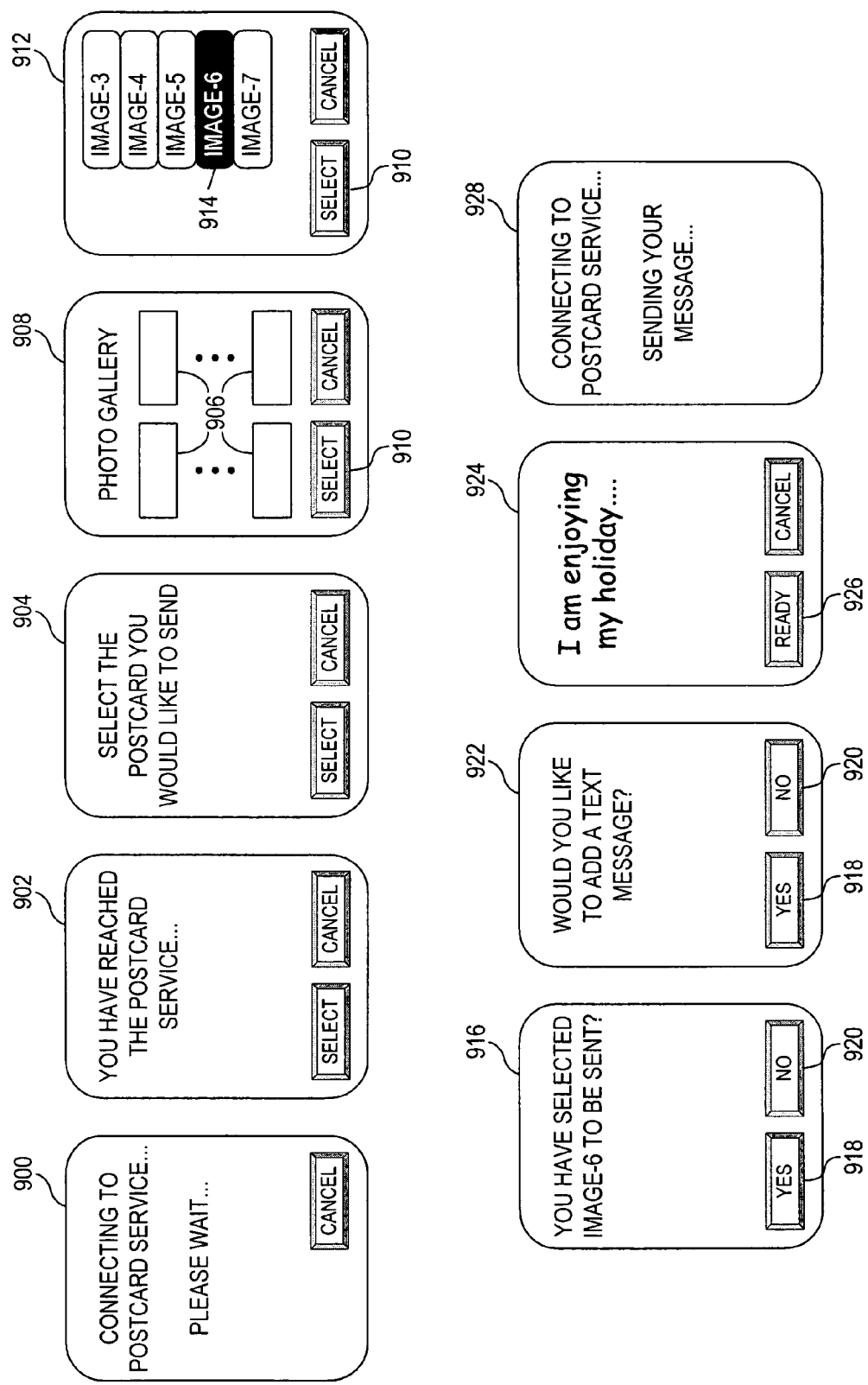
FIG. 9 illustrates an embodiment of the invention involving establishing a connection a server in response to information received from a transponder, where the server provides the user with selectable postcard options.

As previously indicated, the content may be provided at the mobile device, where the user creates the content using a camera, video camera, or other content generation module. In other embodiments, a kiosk or other mechanism may be provided to allow the user to identify one or more desired content items. The user may download the content from the kiosk in some embodiments, or the user may provide a tag ID to a network service that can determine the desired content from the tag ID. In still another embodiment of the invention, the content selections are made available by the network service to allow the user to select a desired content item. Such an embodiment may involve communication between the requesting mobile device and the network service. For example, the RFID tag may provide the user with information that may automatically establish a connection with a network postmark service, or with information allowing the user to manually establish such a connection. FIG. 9 illustrates an embodiment where a connection is established with a server (e.g., WAP server) in response to information received from the tag, and where the server provides the user with the postcard options.

The embodiment of FIG. 9 shows a representative series of user interface (UI) screens available on the initiating mobile device used to facilitate selection of a desired image, video or other content for a digital postcard. The communication between the mobile device and the network service may be accomplished using various communication methodologies, such as via a Wireless Application Protocol (WAP) application. Thus, the RFID tag may provide an application ID for the mobile device to open a WAP application, and may also provide an address of the postmark service.

The UI screens of FIG. 9 illustrate a representative sequence of events after the user has touched an RFID-enabled mobile device to an RFID tag in the area. As shown in FIG. 9, the UI screen 900 indicates that the device is being connected to a postcard service. This may be initiated in response to receiving connection-initiation data from the RFID tag, such as an application ID. When the mobile device receives the application ID, it can use the application ID to invoke the appropriate application to establish the connection with the postcard service as shown at screen 900.

When the user has established a connection with the postcard service as shown at UI screen 902, the user is prompted to select the desired postcard to send as shown at UI screen 904. One or more available images 906 are presented at UI screen 908 from which the user may select. The user may select a desired image by highlighting the desired image 906 and activating the SELECT button 910. Alternatively, each of the images 906 may be associated with an identifier, which can be selected as shown at UI screen 912. In the illustrated embodiment, the user has highlighted item 914 corresponding to IMAGE-6, which can be selected using any appropriate UI mechanism such as the SELECT button 910. A confirmation message may be provided as shown at UI screen 916, and the user may acknowledge the selection using any appropriate UI mechanism such as the YES button 918, or cancel the selection using the NO button 920. The user may also be presented with an option to add a text message to the postcard, such as shown at UI screen 922. If the user chooses not to add a text message, the user can activate the NO 920 UI button. If the user would like to add a text message, the YES 918 item is selected, and the user is presented with a screen 924 where text may be entered. When the user has completed the text message, the user may indicate this using any appropriate UI mechanism such as the READY 926 UI button. In response, a screen 928 is presented to indicate that the information is being provided to a network postcard service to create the postcard.

It should be noted that the embodiment described in connection with FIG. 9 may similarly be used in embodiments where the user creates the content at the mobile device, or otherwise receives the content from another source (e.g., kiosk). For example, the user may create content or select content from a kiosk, and when the user touches the appropriate RFID tag, the information received may initiate a connection with a WAP server or directly with the postcard service.

As indicated above, the user may enter text to be associated with the postcard. Conventional postcards typically include a message handwritten by the postcard sender. While text messages may be entered in any conventional manner, one particularly beneficial embodiment involves the use of a digital pen, such as the NOKIA DIGITAL PEN commercially available by the assignee of the present invention. Generally, such a digital pen is used as a normal pen but is a digital instrument that records as it writes. The pen works in combination with "digital paper," which makes it possible for the pen to remember what was written. The pen can then connect wirelessly with a mobile phone or other wireless device via short-range wireless transmission technologies such as Bluetooth. In this manner, a text message may be written in the user's own handwriting. Such a handwritten message may be included with the postcard of the present invention, to make a more personalized postcard.

In another embodiment, a digital pen such as described above may be used to create a library of a user's handwriting. When a library of the user's handwriting has been created, the user can enter text in any convenient manner, such as via the keypad on the user's mobile device. By running the entered text through a handwriting conversion engine in accordance with the present invention, the output text appears to be in the user's handwriting since the conversion engine is based on handwriting samples originally provided by the user.

Figure 10:
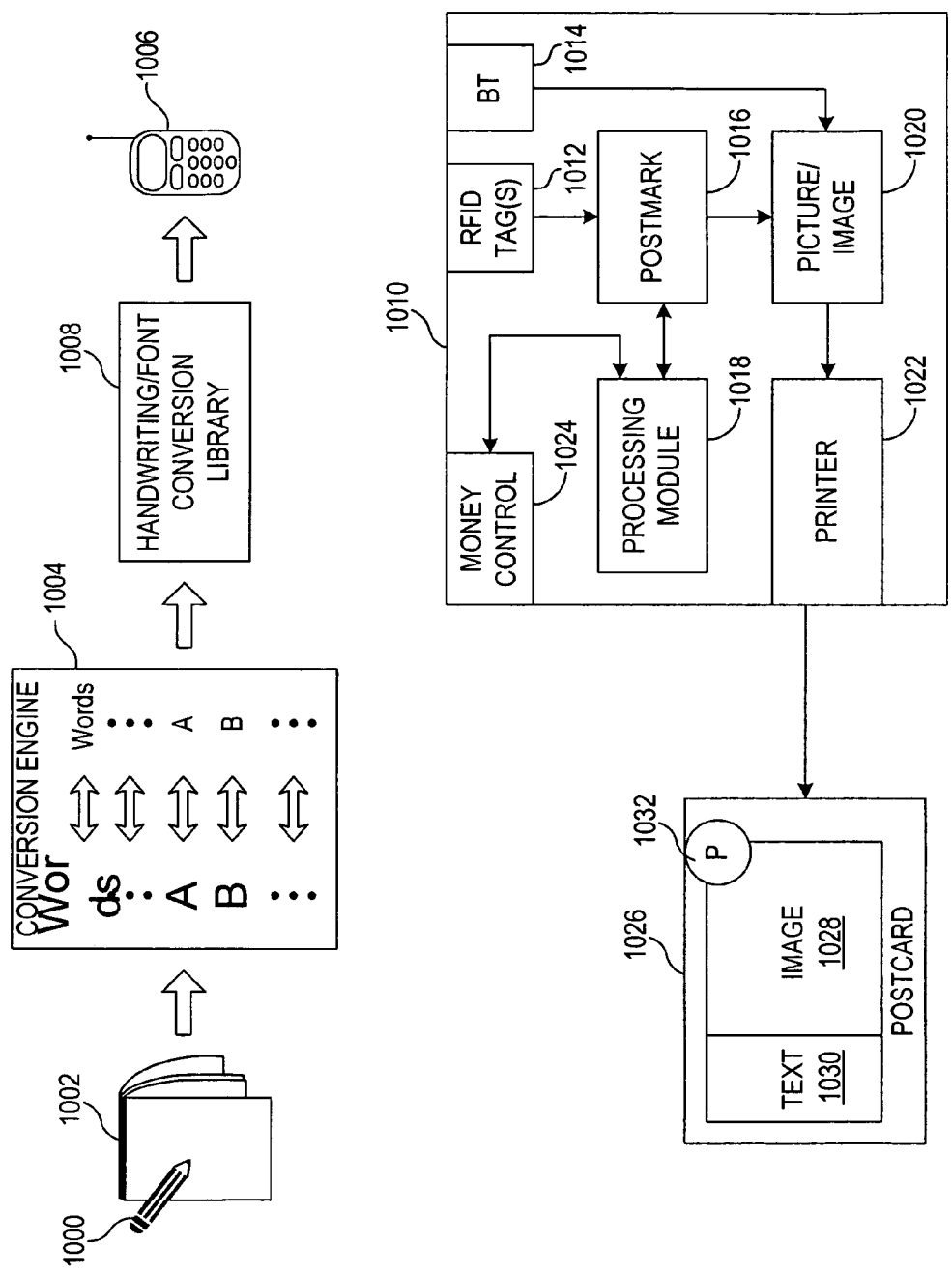
FIG. 10 is a block diagram illustrating a representative manner for including handwritten text on postcards in accordance with one embodiment of the present invention.

FIG. 10 is a block diagram illustrating a representative manner for including handwritten text on postcards in accordance with the present invention. A user may hand-write text using a digital pen 1000 and digital paper 1002 as previously described. A conversion engine 1004 can be used to convert phrases, words, letters, or other written characters to a standard text font. The conversion engine 1004 recognizes the handwritten characters and suggests corresponding results in the text font that the user can accept as correct or modify to correspond to the correct handwriting. The conversion engine 1004 may be included in the mobile device 1006, or otherwise accessible to the mobile device 1006 via a network(s). Based on accepted correlations between handwritten and text font characters, a handwriting/font conversion library 1008 is maintained. In this manner, a profile of the user's handwriting versus text can be stored for future use. This library 1008 is maintained at the mobile terminal 1006 or otherwise accessible to the mobile terminal 1006 via a network(s).

The created library 1008 can be used in connection with the postcard/postmark generation system and method of the invention. As an example, the user of the mobile device 1006 may take a picture while at a tourist area. The user may locate a postcard generation unit 1010 that serves as a postmark kiosk as previously described. More particularly, the user can create a message, such as an MMS message, and attach the picture created by the user. Alternatively, the user can select a predefined image from the unit 1010. Assuming the user created the picture, it is attached to the MMS message, and other information including a text message or greeting that the user can enter via the keypad or other UI on the mobile device 1006. Using the conversion library 1008, the user's UI-entered text message may be converted to a handwritten message. The conversion engine 1004 may also be used, e.g., where some characters are not in the library 1008. Thus, the NMS or other analogous message created by the user can include at least the created image and the text message converted to a handwritten message.

In accordance with one embodiment of the invention, the postcard generation unit 1010 includes one or more interfaces such as RFID, Bluetooth, Wireless Local Area Network (WLAN), Ultra Wideband (UWB), etc. In the illustrated embodiment, the unit 1010 includes one or more RFID tags 1012 and a Bluetooth (BT) 1014 interface. Thus, the user can open the MMS application by touching an RFID tag 1012, or may open the MMS application manually. By touching the RFID tag 1012, the tag 1012 can provide the appropriate MMS settings automatically for the user, and may initiate the generation of the postmark using the postmark module 1016 in connection with the processor 1018. In another embodiment, the user can touch one of a plurality of RFID tags 1012 to identify a desired image, thereby obviating the need to create the content at the mobile device. In the illustrated embodiment, the postmark may include a postage stamp or mark suitable for standard mail delivery. Further, the RFID tag 1012 may provide the information required to initiate a Bluetooth connection via the Bluetooth interface 1014.

When the Bluetooth connection has been established, the MMS message created by the user, which includes the image, destination address(es), and converted text in this example, is delivered to the unit 1010 via the Bluetooth connection 1014. The image for the postcard is created at the image module 1020, which includes the converted-to-handwriting text. The postmark is also placed on the image, and the resulting postcard may be printed via the printing module 1022. Further, the user may be required to enter money, a credit/debit card, or other form of payment which may be processed by the money control unit 1024 in connection with the processor 1018. Alternatively, the money control unit 1024 may process payment such that the user is charged by charging an account with the user's network operator.

The printing mechanism 1022 can therefore provide a printed postcard 1026. In this embodiment, the resulting postcard 1026 includes the image 1028 created by the user, the text 1030 as converted to handwriting, and the postmark 1032 that includes postage in this example. The user can then simply place the resulting postcard 1026 in a mailbox. Alternatively, the resulting postcard can be electronically delivered to intended recipients identified by the user in the MMS message.

It should be noted that a conversion engine 1004 may also be provided at the unit 1010. For example, a database of user profiles may be stored at the unit 1010, where each user profile includes user input entries and corresponding handwriting entries. In other words, a particular user profile includes user handwriting equivalents of electronic text entries. The conversion engine 1004 can convert from handwriting to electronic text fonts, or from electronic text fonts to handwriting. Therefore, where such user profiles are stored at or otherwise available to the unit 1010, a mobile device user can enter text using standard user interface functions on the mobile device which can be converted to the user's handwriting based on the user profile associated with that user. This is particularly beneficial for users of mobile devices that do not include a conversion engine 1004 and/or handwriting/font conversion library 1008 at the mobile device 1006.

Figure 11:
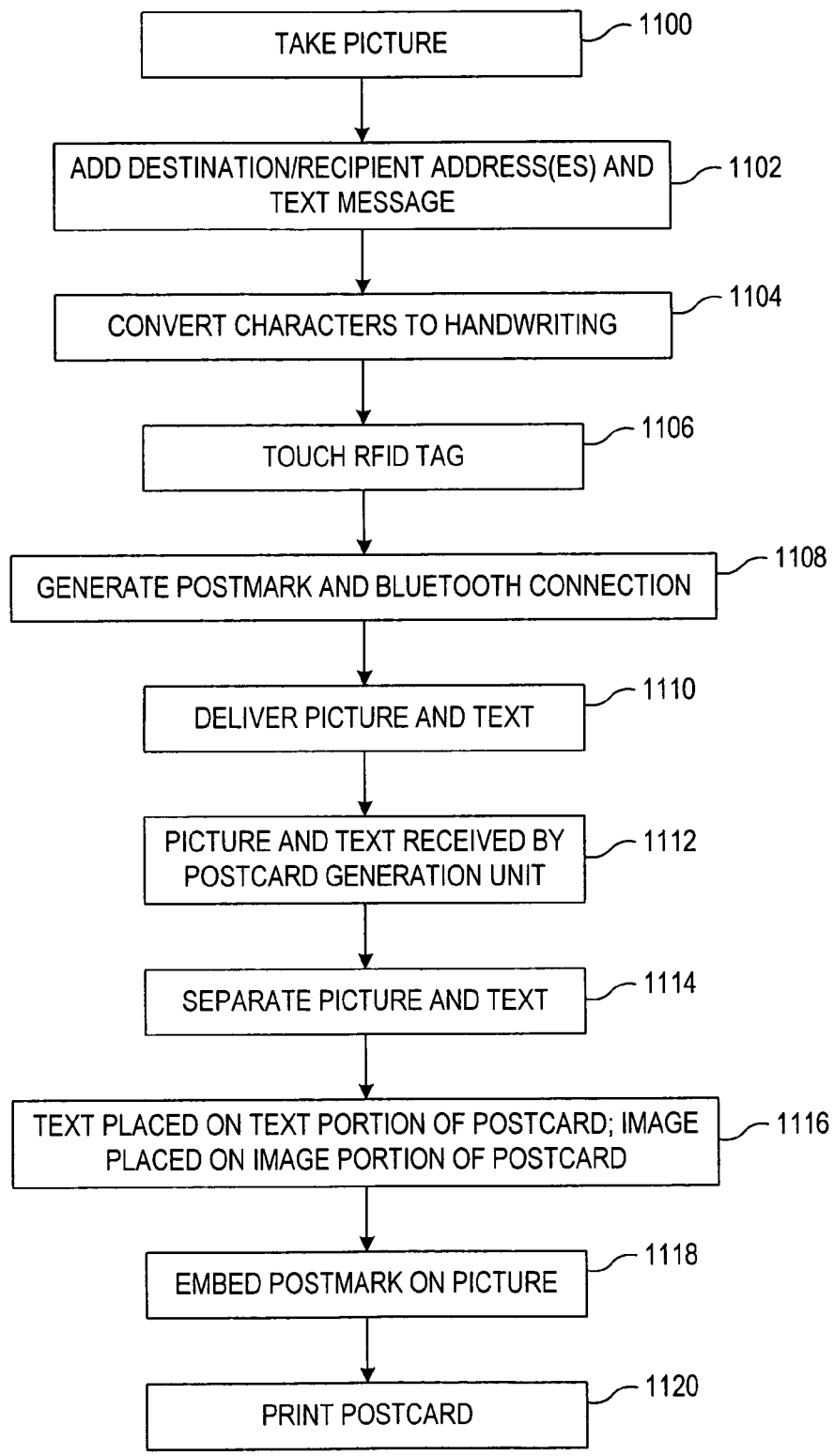
FIG. 11 is a flow diagram illustrating a representative manner for including handwritten text on postcards in accordance with the present invention.

FIG. 11 is a flow diagram illustrating a representative manner for including handwritten text on postcards in accordance with the present invention. In the illustrated embodiment, the user takes a picture 1100 using the camera feature on his/her mobile device. The user creates an MMS message that includes the image, one or more destination addresses of targeted recipients, and a text message as shown at block 1102. This information may be retained in the user's mobile device display while the text message is converted 1104 to handwriting. The user touches 1106 his/her RFID-capable mobile device to the RFID tag associated with a postcard generation unit, and receives a postmark and connection information (e.g., Bluetooth connection information) to establish the connection with the Bluetooth interface of the postcard generation unit as indicated at block 1108. It should be noted that the postmark may be transmitted to the mobile device, or may be generated and kept at the postcard generation unit. Over the Bluetooth connection, the MMS message, and consequently the image and text (and postmark if not retained at the postcard generation unit) are delivered 1110 to the postcard generation unit. This information is received 1112 by the postcard generation unit, where the picture and text are separated 1114. The text is placed on a text portion of the postcard, and the image is placed on an image portion of the postcard as shown at block 1116. Where destination addresses are provided by the user, such destination addresses may be placed in the appropriate address portion of the postcard. The postmark is embedded 1118 on the picture, and the postcard is printed 1120.

Figure 12:
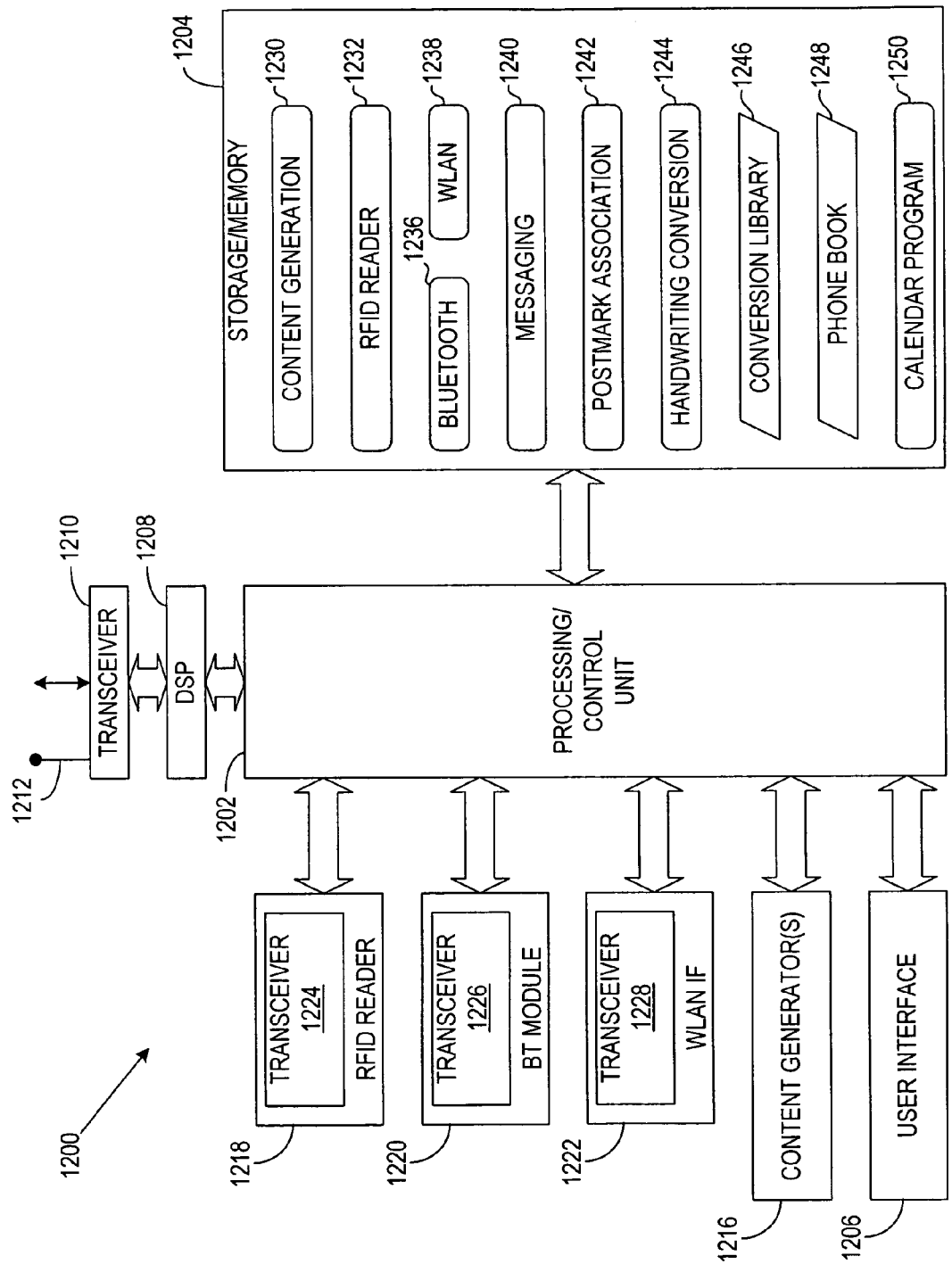
FIG. 12 illustrates a representative mobile device computing system capable of carrying out operations in accordance with the invention.

The mobile devices described in connection with the present invention may be implemented as any number of different devices, such as wireless/cellular telephones, personal digital assistants (PDAs), or other wireless handsets, as well as portable computing devices capable of wireless communication. The mobile devices utilize computing systems to control and manage the conventional device activity as well as the functionality provided by the present invention. Hardware, firmware, software or a combination thereof may be used to perform the various functions and operations described herein. An example of a representative mobile device computing system capable of carrying out operations in accordance with the invention is illustrated in FIG. 12.

The exemplary mobile computing arrangement 1200 suitable for performing the operations in accordance with the present invention includes a processing/control unit 1202, such as a microprocessor, reduced instruction set computer (RISC), or other central processing module. The processing unit 1202 need not be a single device, and may include one or more processors. For example, the processing unit may include a master processor and associated slave processors coupled to communicate with the master processor.

The processing unit 1202 controls the basic functions of the mobile device as dictated by programs available in the program storage/memory 1204. Thus, the processing unit 1202 executes the functions associated with the postcard generation aspects of the present invention. More particularly, the program storage/memory 1204 may include an operating system and program modules for carrying out functions and applications on the mobile device. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

The software modules associated with the present invention may also be transmitted to the mobile computing arrangement 1200 via data signals, such as being downloaded electronically via a network, such as the Internet and intermediary wireless networks.

The program storage/memory 1204 may also be used to store data, such as created content as well as identifier information provided by an RFID tag, Bluetooth, etc. In one embodiment of the invention, the content is stored in non-volatile electrically-erasable, programmable ROM (EEPROM), flash ROM, etc. so that the content is not lost upon power down of the mobile device.

The processor 1202 is also coupled to user-interface 1206 elements associated with the mobile device. The user-interface 1206 may include, for example, a display such as a liquid crystal display, a keypad, speaker, microphone, etc. Alternatively, other user-interface mechanisms may be employed, such as voice commands, switches, touch pad/screen, graphical user interface using a pointing device, trackball, joystick, digital pen, or any other user interface mechanism. These and other user-interface 1206 components are coupled to the processor 1202 as is known in the art.

The mobile computing arrangement 1200 may also include components for performing traditional communications such as cellular communications. A digital signal processor (DSP) 1208 may perform a variety of functions, including analog-to-digital (A/D) conversion, digital-to-analog (D/A) conversion, speech coding/decoding, encryption/decryption, error detection and correction, bit stream translation, filtering, etc. A transceiver 1210, generally coupled to an antenna 1212, may be provided to transmit and receive cellular radio signals between the wireless device and a cellular network.

In accordance with the present invention, the mobile computing arrangement 1200 may include one or more content generation modules 1216, such as a digital camera, video recorder, audio recorder, etc. Using such devices, the user may create content using the mobile device. Furthermore, one or more wireless communication modules may be provided to exchange information as previously described, such as an RFID reader 1218, Bluetooth (BT) module 1220, WLAN interface 1222, or the like, each of which include a respective transceiver 1224, 1226, 1228.

The various content generation module 1216 and wireless communication modules 1218, 1220, 1222 operate in connection with software in one embodiment of the invention. Such software may be stored at the storage/memory 1204. For example, content generation programs 1230 may operate with the content generators 1216 to create and store content, such as images or video used to create postcards in accordance with the invention. Content that is created or obtained elsewhere may be stored as depicted by the content storage module 1232. The RFID reader application 1234 operates in connection with the RFID reader device 1218 to send tag activation signals and receive signals from the tags. Communication software such as a Bluetooth module 1236, WLAN module 1238 or the like may be used in connection with their respective hardware modules 1220, 1022. The mobile device may also include one or more messaging modules 1240, such as SMS, EMS, MMS, e-mail, or other messaging applications.

As previously described, one embodiment of the invention involves the mobile device receiving postmark information from a transponder in an area corresponding to the user's location when content (e.g., image) is created. In such cases, the mobile device may itself associate the received postmark information with the image, and send the resulting digital postcard to one or more recipients. In such an embodiment, the mobile device includes a postmark association module 1242, which in one embodiment includes one or more programs operable with the processor 1202 to embed the postmark on the digital postcard.

In other embodiments, text entered as a greeting or other text may be converted to handwriting pursuant to a profile stored for the user. In such embodiments, the mobile device may include a handwriting conversion module 1244 to perform such conversions, and/or may include a conversion library 1246 as described in connection with FIGS. 10 and 11. A phone book database 1248 or other contacts application may also be provided to store and/or maintain destination addresses and possibly terminal characteristics as described in connection with FIG. 8. In addition, a calendar program 1250 may be provided, which may be used in an embodiment such as that described in connection with FIGS. 13 and 14 below.

The mobile computing arrangement 1200 of FIG. 12 is provided as a representative example of a computing environment in which the principles of the present invention may be applied. From the description provided herein, those skilled in the art will appreciate that the present invention is equally applicable in a variety of other currently known and future mobile computing environments. For example, the various software modules in accordance with the present invention may be stored in a variety of manners, may be operable on a variety of processing devices, and may be operable in mobile devices having additional, fewer, or different supporting circuitry and user-interface mechanisms.

The principles of the present invention may also be applied in other situations where marking of content with postmark-like information is beneficial. One such situation involves employment situations where employees in the field have scheduled service events or other appointments and want/need to record the fact that they have completed or attended the appointment. A more particular example is where a service employee is required to inspect and/or service equipment or operations at various locations, and a record of such inspections or servicing is desired or needed for regulatory or employment verification purposes. For these and other situations where proof of the employee's presence at the location is desirable or required, the present invention can be used to confirm the employee's presence and indicate when the employee was at a particular location.

Figure 13:
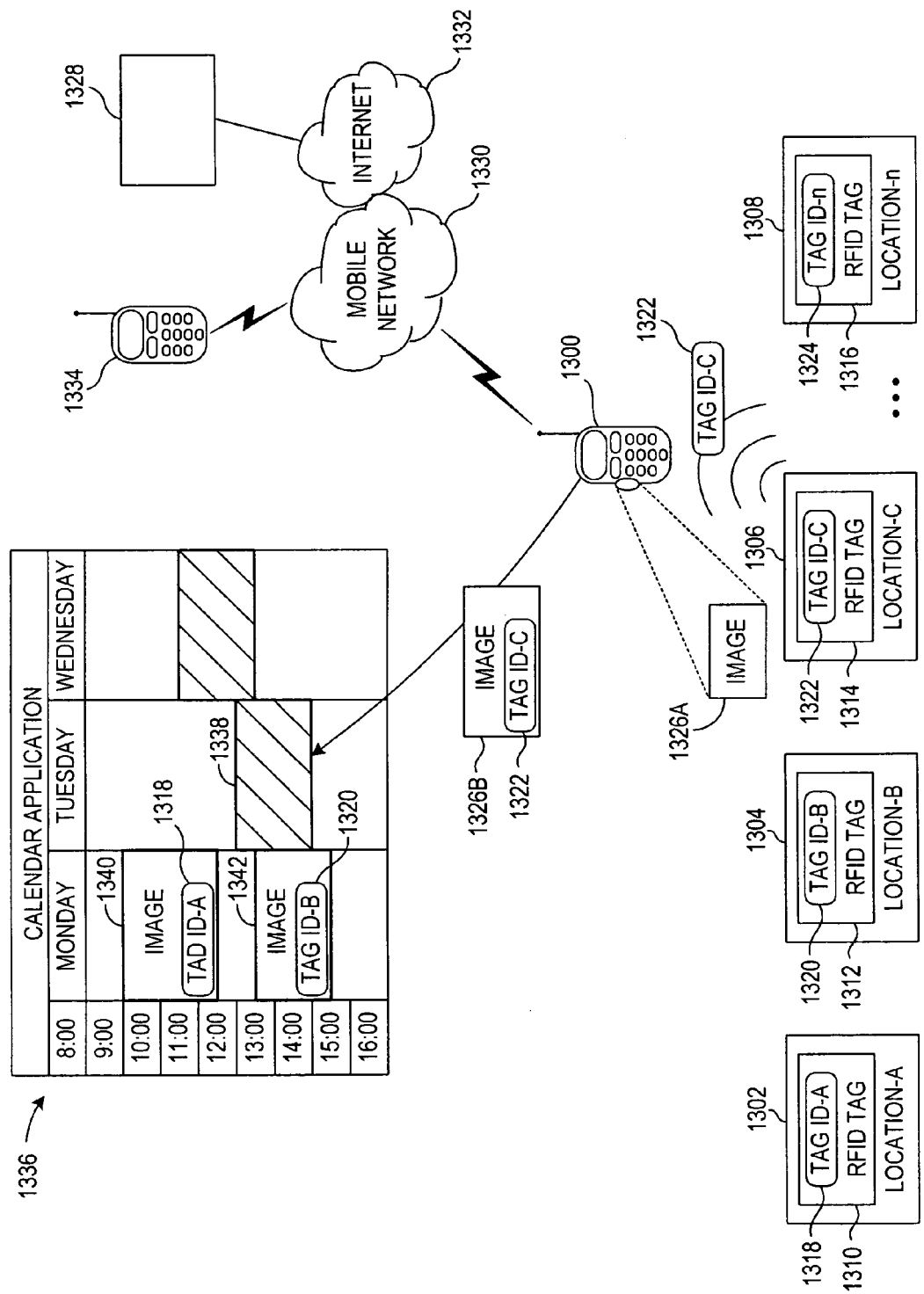
FIG. 13 is a block diagram illustrating one embodiment involving the association of postmark-like information with images gathered in connection with an employment situation.

FIG. 13 is a block diagram illustrating one embodiment involving the association of postmark-like information with images gathered in connection with an employment situation. In the illustrated embodiment, a worker is provided with a mobile device 1300, and is scheduled to be at different locations 1302, 1304, 1306, . . . 1308 throughout a given week. At each location 1302, 1304, 1306, 1308, an RFID tag 1310, 1312, 1314, 1316 or other analogous transmitter is respectively provided, and each tag respectively includes a tag ID 1318, 1320, 1322, 1324.

An operational example is now provided. On a given day, the worker attends an appointment at location-C 1306. An RFID tag 1314 having an associated tag ID 1322 is provided at that location, to facilitate confirmation of the worker's attendance at the scheduled event. The worker touches his/her RFID reader to the RFID tag 1314, which activates the tag 1314 and causes at least the tag ID-C 1322 to be transmitted to the mobile device 1300. The RFID tag 1314 may also provide an application ID to automatically invoke a camera application at the mobile device 1300, or the worker may manually initiate the camera application. The worker takes a picture at the location-C 1306 and produces at least one image 1326A. In one embodiment, an association module at the mobile device 1300 associates at least the tag ID-C 1322 with the image 1326A, producing the tagged image 1326B that includes the tag ID-C 1322. For example, the tag ID 1322 can be visually embedded onto the image 1326A to produce the resulting tagged image 1326B. Including this information on the resulting image 1326B provides evidence that the worker was actually at the location-C 1306.

In another embodiment, a tag ID does not need to be attached to the image 1326B, as the image itself provides enough information to determine the worker's location. However, information other than a tag ID or textual location identifier may be included at the tag ID 1322 location on the image. More particularly, other information may optionally be embedded or otherwise associated with the image 1326A, such as the time, date, or other attribute. Such attributes may be provided by the respective RFID tag, or alternatively may be provided by the mobile device 1300. For example, the mobile device 1300 may maintain a date and time, which can be used to embed the date and/or time on the resulting image 1326B. Including the date and/or time with the resulting image 1326B provides evidence of when the worker was actually at location-C 1306.

The resulting tagged image 1326B may be directly transmitted to a database or other storage associated with the worker's company, such as by transmitting the image 1326B to a storage facility 1328 associated with the company via the mobile network 1330 and Internet 1332. For example, the worker may upload the image 1326B to a local network or web site, or may send the image 1326B via a message such as an MMS message, or the like. The worker may also send the image 1326B directly to another device 1334 of another employee, manager, etc.

In one particularly advantageous embodiment, the image may be recorded in a calendar application 1336. The calendar application 1336 is preferably resident on the mobile device 1300, but may also be hosted elsewhere and accessible to the mobile device 1300. The RFID tag 1314 may provide an application ID to automatically invoke the calendar application at the mobile device 1300, or the worker may manually initiate the calendar application. In one embodiment, the date and time provided by the mobile device 1300 or the RFID tag 1314 is used to enter the tagged image 1326B (or a link to the image 1326B) into the appropriate time slot on the calendar application 1336. For example, if it is Tuesday and the time at which the image 1326A was taken was 13:00, then the tagged image 1326B is recorded at that calendar slot 1338. In one embodiment, the image can replace or supplement a pre-existing appointment at calendar slot 1338. This is further illustrated by viewing a previous day, where the calendar application 1336 illustrates that the worker was at location-A 1302 on Monday, as a resulting tagged image 1340 including tag ID-A 1318 from location-A 1302 has been recorded. Similarly, the calendar application 1336 illustrates that the worker was also at location-B 1304 on Monday, as a resulting tagged image 1342 including tag ID-B 1320 from location-B 1304 recorded.

In one embodiment, touching the appropriate tag 1310, 1312, 1314, 1316 will generate an entry to the calendar application 1336 so that the worker is able to enter the tagged image and/or message into that entry. In such an embodiment, touching the same tag a second time can close the calendar event. Thus, the calendar application 1336 can open an entry when the worker first accesses information from the particular RFID tag, and close the entry when the worker is finished. In this manner, the duration of the worker's stay can also be recorded to the calendar application 1336.

An alternative embodiment involves a variation of the calendar application embodiment. In such an embodiment, a particular application resides on the mobile device, where the application can only be opened by touching the specific RFID tag with relevant ID information. When the application has been opened by touching the tag, content may be entered in the manners described herein. In one embodiment, a limited time duration may be allowed to complete the entry to the calendar, where such time duration is measured from the initial touching of the tag using a device clock. Time can also be measured between the touches of the tag to produce a usage report, such as the time between an initial tag touch and a tag touch when the task has been completed.

The calendar may be maintained at the mobile device 1300, and periodically uploaded to a company site or other employer system 1328 and/or other communication device 1334. In this manner the calendar information can be backed up, evaluated by company personnel, or otherwise analyzed. Co-workers, managers, regulatory authorities, or other relevant persons can therefore obtain knowledge of what has occurred.

Figure 14:
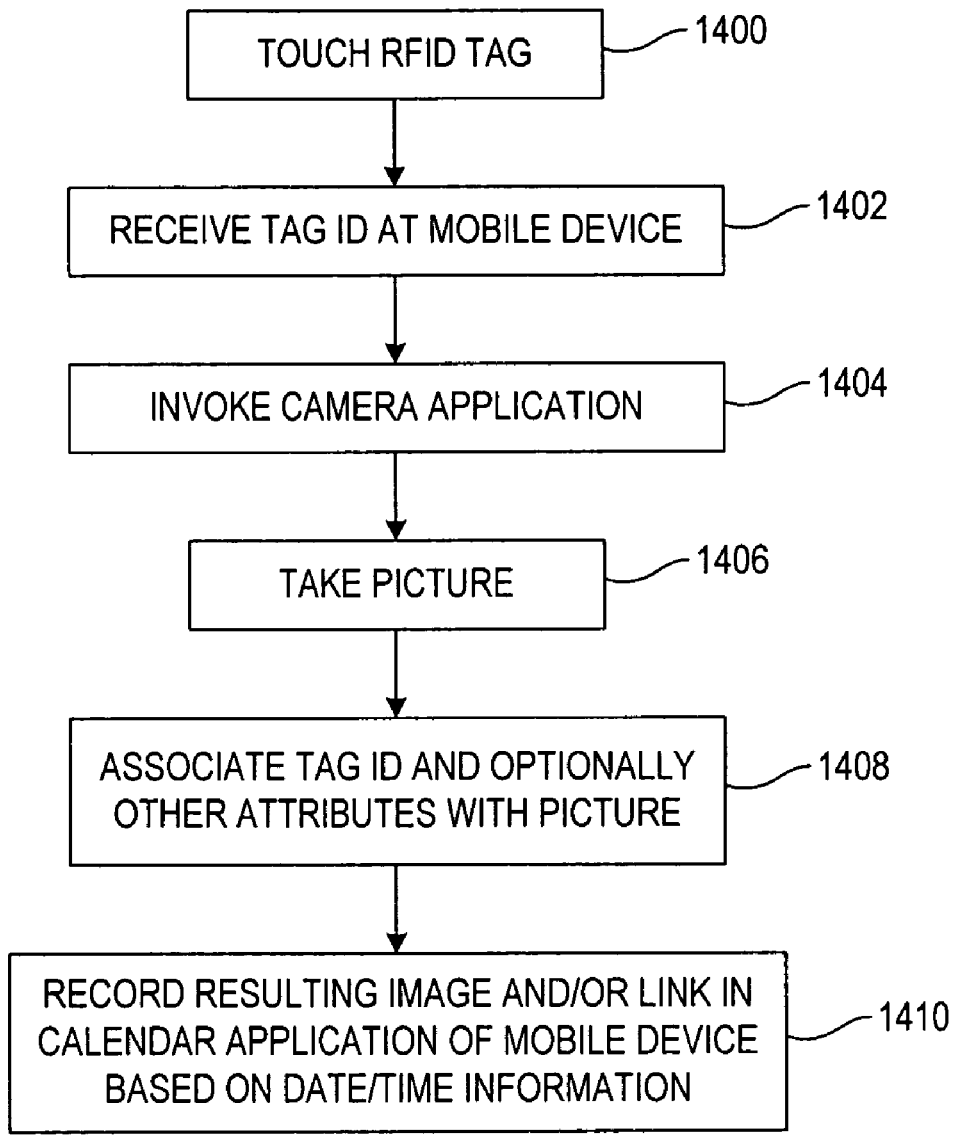
FIG. 14 is a flow diagram illustrating a method for evidencing events and activities in accordance with one embodiment of the present invention.

FIG. 14 is a flow diagram illustrating a method for evidencing events and activities in accordance with the present invention. A mobile device user touches the RFID-capable mobile device to an appropriate RFID tag as shown at block 1400. The tag ID or other unique identifier is received 1402 at the mobile device. A camera (including video) application is invoked 1404, either by way of an application ID provided via the RFID tag or manually by the user. The user takes a picture(s) at the location. The tag ID or other unique identifier, as well as other optional attributes such as the date and/or time, are associated 1408 with the picture. As previously indicated, this association involved embedding visual indicia corresponding to the tag ID, date, time, etc. The tag ID may be used as an index in a database, where the tag ID corresponds to a location name such as "Company A, Building 2." Alternatively the tag ID itself may be used. In any event, the information may be embedded into the image in a manner analogous to the previously described postmarks. In another embodiment, the information may be digitally embedded as a watermark that is not necessarily visually perceivable, but is electronically perceivable.

The resulting image may be recorded 1410 in a calendar application of the mobile device based on date and time information. The tagged image may also be recorded in a spreadsheet, word processing document, or other designated application document other than a calendar application. Further, in one embodiment, the tagged image itself is not recorded in the application, but rather a link is provided to a network location from which the tagged image may be retrieved.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "computer-readable medium" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, other short-range wireless technologies may be used instead of, or in addition to, RFID or other similar RF technology. For example, infrared technology may be used to communicate information, as well as other types of wireless communication technology. As another example, barcode technology can be used, such that the transponder corresponds to an electronically perceivable barcode. Further, while the description provided herein largely focuses on the use of images for postcards, digital postcards may include images, video, and even audio. For example, visual or audio postmark information could be included with an audio recording, such as where the user wants to prove to recipients that he/she was at concert, auto race, speech, or other event where audio may be recorded as a digital audio postcard. Thus, it is intended that the scope of the invention be limited not with this detailed description, but rather determined by the claims appended hereto.

What is claimed is:

1. A method for creating postcards, comprising:
    receiving information at a mobile device from at least one transponder, wherein the information includes at least a transponder identifier (ID);
    creating a message including the transponder ID at the mobile device, and delivering the message to a network service;
    locating postmark information at the network service based on the transponder ID; and
    associating the postmark information with a content item to create a digital postcard;
    wherein the information received from the at least one transponder further includes a network address of the network service, and wherein delivering the message to the network service comprises delivering the message to the network address of the network service.

2. The method of claim 1, further comprising locating the content item at the network service based on the transponder ID.

3. The method of claim 1, further comprising creating the content item at the mobile device, wherein:
    creating a message comprises creating the message to further include the created content item; and
    associating the postmark information with a content item comprises associating the postmark information with the created content item.

4. The method of claim 1, wherein creating a message comprises creating the message to further include one or more destination addresses of intended recipients of the digital postcard, and further comprising delivering the digital postcard from the network service to the one or more destination addresses of the intended recipients.

5. The method of claim 4, wherein the destination addresses comprise network addresses, and wherein delivering the digital postcard from the network service to the one or more destination addresses comprises delivering the digital postcard to the network addresses over one or more networks.

6. The method of claim 4, further comprising printing the digital postcard, wherein:
    the destination addresses comprise physical addresses; and
    delivering the digital postcard from the network service to the one or more destination addresses comprises delivering the printed digital postcard to the physical addresses of the one or more intended recipients.

7. The method of claim 1, wherein the information received from the at least one transponder further includes an application identifier (ID), and further comprising invoking a messaging application at the mobile device corresponding to the received application ID.

8. The method of claim 1, wherein associating the postmark information with the content comprises visually embedding the postmark information into the digital postcard.

9. The method of claim 1, wherein creating a message comprises creating the message to include a text message for inclusion into the digital postcard at the network service.

10. The method of claim 9, wherein creating the message to include a text message comprises:
    maintaining a database of mobile device user input (UI) entries and corresponding handwriting entries;
    converting UI entries to handwriting entries based on the database; and
    incorporating the handwriting entries on the digital postcard that includes the content item and the postmark information.

11. The method of claim 1, wherein the postmark information comprises any one or more of a location name, geographic coordinates, date, time, and postage.

12. A method for creating postcards, comprising:
    providing a plurality of selectable content items at a kiosk located within a vicinity, each of the selectable content items relating to the vicinity and each having a respective content identifier associated therewith;
    transmitting information to a mobile device from at least one transponder, wherein the information includes at least the content identifier of a user-selected content item;
    creating a message including the content identifier at the mobile device, and delivering the message to a network service;
    identifying the user-selected content item at the network service based on the content identifier; and
    associating a postmark with the identified user-selected content item to create a postcard;

wherein the information received from the at least one transponder further comprises a message initiation indicator, and wherein creating the message comprises the mobile device invoking a message application identified by the message initiation indicator and creating the message via the message application.

13. The method of claim 12, wherein the information received from the at least one transponder further includes a network address of the network service, and wherein delivering the message to the network service comprises delivering the message to the network address of the network service.

14. The method of claim 12, wherein creating a message comprises creating a message that further includes one or more destination addresses to identify targeted recipients of the postcard.

15. The method of claim 14, further comprising delivering the postcard to the one or more destination addresses of the targeted recipients over one or more networks.

16. The method of claim 14, wherein the one or more destination addresses comprise one or more physical addresses of the targeted recipients, and further comprising printing the postcard and mailing the printed postcard from the network service to the one or more physical addresses of the targeted recipients.

17. The method of claim 12, wherein creating a message comprises creating the message to include a text message for inclusion into the postcard at the network service.

18. The method of claim 17, wherein creating the message to include a text message comprises:
maintaining a database of mobile device user input (UI) entries and corresponding handwriting entries;
converting UI entries to handwriting entries based on the database; and
incorporating the handwriting entries on the digital postcard that includes the content item and the postmark information.

19. The method of claim 12, wherein the postmark information comprises any one or more of a location name, geographic coordinates, date, time, and postage.

20. The method of claim 12, wherein associating the postmark with the identified user-selected content item comprises visually embedding the postmark into the postcard.

21. The method of claim 12, wherein the transponder is located at the kiosk.

22. A method for creating postcards, comprising:
providing at least connection information to a mobile device via an activated radio frequency (RF) transponder;
receiving a message from the mobile device via a connection established using the connection information, wherein the message includes at least one image and a text message;
identifying a postmark based on an identifier provided by the activated RF transponder; and
creating a postcard including the at least one image, the text message, and the postmark.

23. The method of claim 22, further comprising creating the text message via a user interface (UI) at the mobile device.

24. The method of claim 23, further comprising converting the text message to a handwriting message corresponding to handwriting of a user of the mobile device.

25. The method of claim 24, wherein converting the text message comprises indexing a handwriting-text conversion library to identify handwriting counterparts of the created text message.

26. The method of claim 25, further comprising creating the handwriting-text conversion library using a conversion engine that receives the user's handwriting as input, and associates relationships of handwriting and textual counterparts.

27. The method of claim 22, further comprising printing the created postcard.

28. The method of claim 22, wherein:
providing at least connection information to the mobile device via an RF transponder further comprises providing the identifier to the mobile device via the RF transponder;
the message further includes the identifier; and
identifying a postmark comprises identifying the postmark based on the identifier provided via the message.

29. The method of claim 22, further comprising receiving the identifier at a postmark module from the activated RF transponder, and wherein identifying a postmark comprises identifying the postmark based on the identifier received from the activated RF transponder.

30. A system for creating postcards, comprising:
a radio frequency identification (RFID) tag to provide at least a tag identifier (ID) in response to a reader activation signal;
a mobile device comprising a digital camera to create at least one digital image, an RFID reader to provide the reader activation signal and to receive the tag ID, and a message application to provide a message including at least the tag ID and the at least one digital image; and
a server coupled to receive the message from the mobile device via a network, the server comprising a database of tag IDs and respectively associated postmarks, and a processor configured to identify the postmark from the database that is associated with the tag ID provided in the message, and to create a digital postcard including the at least one digital image and the postmark.

31. A system for creating postcards, comprising:
a postmark kiosk comprising at least one RFID tag to provide at least a tag identifier (ID) in response to a reader activation signal;
a mobile device comprising a radio frequency identification (RFID) reader to provide the reader activation signal and to receive the tag ID, and a message application to provide a message including at least the tag ID;
a server coupled to receive the message from the mobile device via a network, the server comprising a database of tag IDs and respectively associated postmarks and images, and a processor configured to identify the image and postmark from the database that are associated with the tag ID provided in the message, and to create a digital postcard including the identified image and postmark.

32. The system of claim 31, wherein the postmark kiosk further comprises a plurality of selectable postcard images each associated with a different tag ID, wherein the at least one RFID tag provides the tag ID corresponding to a postcard image selected by a user of the mobile device.

33. The system of claim 32, wherein the at least one RFID tag comprises a plurality of RFID tags, each associated with a different one of the selectable postcard images and associated tag IDs, wherein the RFID tag associated with the selected postcard image provides its corresponding tag ID in response to the reader activation signal.

34. The system of claim 31, wherein the RFID tag further provides an application ID, and wherein the message application is invoked in response to receipt of the application ID.

35. A system for creating postcards, comprising:
   a radio frequency identification (RFID) tag to provide connection information to a mobile device in response to an RFID activation signal;
   a wireless communication interface to receive a message including at least one image and a text message from the mobile device over a connection established using the connection information;
   a processing module configured to create a digital postcard including at least the image, the text message, a post stamp, and a postmark;
   a printer to print the digital postcard;
   a database of user profiles, each of the user profiles including user input entries and corresponding handwriting entries; and
   a conversion engine to convert the text message of user input entries to the corresponding handwriting entries based on the user profile of the mobile device user.

36. The system of claim 35, wherein the wireless communication interface comprises any of a Bluetooth interface, a Wireless Local Area Network (WLAN) interface, and Ultra Wideband (UWB) interface.

37. The system of claim 36, wherein the message received via the wireless communication interface comprises a Multimedia Messaging Service (MMS) message.

38. The system of claim 35, wherein the postmark information comprises any one or more of a location name, geographic coordinates, date, time, and postage.

39. The system of claim 38, wherein the wireless communication interface transmits at least the image as a calendar entry, based on at least one of the date and the time, to the mobile device.

40. The system of claim 39, wherein the processing module is further configured to visually embed any one or more of the location name, geographic coordinates, date, time, and postage information onto the image.

41. The system of claim 35, wherein the processing module is configured to create the digital postcard including the converted text message.

42. The system of claim 35, wherein the RFID tag further provides an identifier of a user-selected image, and wherein the at least one image received with the message via the wireless communication interface comprises the identifier of the user-selected image versus the image itself.

43. A system for creating postcards, comprising:
   a radio frequency identification (RFID) tag to provide connection information to a mobile device in response to an RFID activation signal;
   a wireless communication interface to receive a message including at least one image and a text message from the mobile device over a connection established using the connection information;
   a processing module configured to create a digital postcard including at least the image, the text message, a post stamp, and a postmark; and
   a printer to print the digital postcard;
   wherein the wireless communication interface transmits at least the image as a calendar entry, based on at least one of the date and the time, to the mobile device, and the processing module is further configured to visually embed any one or more of the location name, geographic coordinates, date, time, and postage information onto the image.

* * * * *